(12) United States Patent
Tomita

(10) Patent No.: US 6,233,648 B1
(45) Date of Patent: May 15, 2001

(54) DISK STORAGE SYSTEM AND DATA UPDATE METHOD USED THEREFOR

(75) Inventor: Haruo Tomita, Iruma (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/130,102

(22) Filed: Aug. 6, 1998

(30) Foreign Application Priority Data

Dec. 26, 1997 (JP) .................................................. 9-366782

(51) Int. Cl.$^7$ ...................................................... G06F 12/00
(52) U.S. Cl. .............................. 711/4; 711/103; 711/118; 711/170; 711/205
(58) Field of Search ............................. 711/4, 103, 118, 711/170, 205

(56) References Cited

U.S. PATENT DOCUMENTS

| | | | |
|---|---|---|---|
| 5,124,987 | * 6/1992 | Milligan et al. | 714/7 |
| 5,530,948 | * 6/1996 | Islam | 714/6 |
| 5,613,088 | * 3/1997 | Achiwa et al. | 711/155 |
| 5,822,782 | * 10/1998 | Humlicek et al. | 711/170 |
| 6,058,455 | * 5/2000 | Islam et al. | 711/114 |

FOREIGN PATENT DOCUMENTS

| | | |
|---|---|---|
| 06214720 | 8/1994 | (JP) . |
| 06266510 | 9/1997 | (JP) . |

* cited by examiner

*Primary Examiner*—Do Hyun Yoo
*Assistant Examiner*—Mehdi Namazi
(74) *Attorney, Agent, or Firm*—Finnegan, Henderson, Farabow, Garrett, & Dunner, L.L.P.

(57) ABSTRACT

A disk storage system with a RAID architecture includes a write buffer having a storage capacity corresponding to one stripe, a buffer management table, and a controller. The controller stores, in the write buffer, logical blocks whose data lengths are changed, as needed, and delays updating of the logical blocks stored in the write buffer in data update processing until the number of stored logical blocks reaches N*K−1 The controller then performs a continuous write operation to sequentially write N*K logical blocks, obtained by adding a logical address tag block to the N*K−1logical blocks, in contiguous areas of empty areas different from the areas in which the old data are stored.

17 Claims, 21 Drawing Sheets

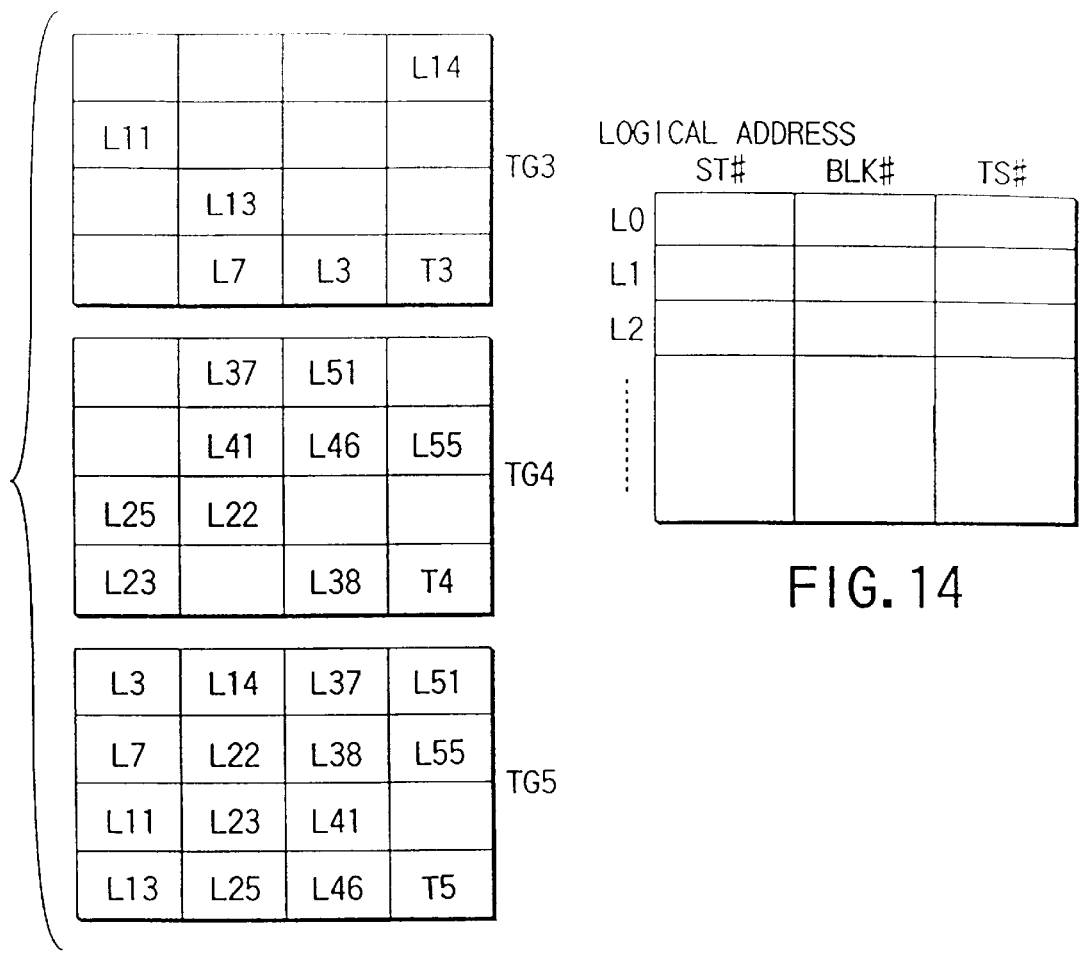
FIG. 13
FIG. 14
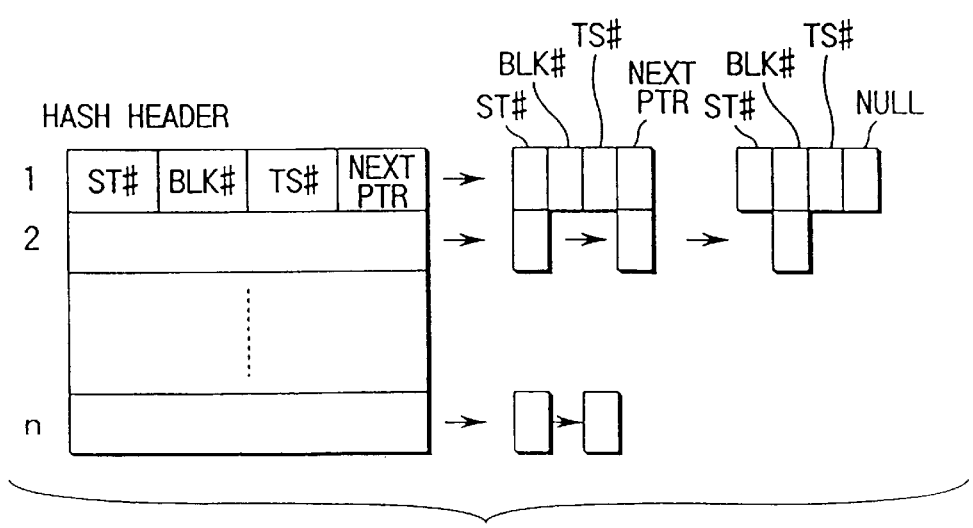
FIG. 16

| SG# | CONVERSION MAP WHEN SEGMENT IS SWICHED |
|---|---|

SEGMENT MANAGEMENT DATA

DISK STORAGE SYSTEM AND DATA UPDATE METHOD USED THEREFOR

RELATED APPLICATION

The present application is related to co-pending application bearing Ser. No. 09/128,774 which was filed on Aug. 4, 1998, and is assigned to the same assignee as the present invention.

BACKGROUND OF THE INVENTION

The entire contents of Japanese Patent Application No. H09-366782 filed on Dec. 26, 1997 are incorporated herein by reference.

The present invention relates to a disk storage system including a disk array unit called a RAID (Redundant Arrays of Inexpensive Disks) and, more particularly, to a disk storage system having an improved data update function.

A disk array unit (called a RAID) constituted by a plurality of disk drives is known. For example, a RAID is a disk storage system which is connected to a network server and can store a large volume of data. As a high-speed data write method for such a RAID, in particular, a method of writing new data in bulk in data update processing without rewriting the new data in the storage area of old data has been proposed. More specifically, the new data is stored in a prepared write buffer, and the stored new data is written in empty areas prepared in disk drives in bulk (see Jpn. Pat. Appln. KOKAI Publication Nos. 6-214720 and 6-266510).

A conventional write method (data update method) will be briefly described with reference to FIG. 1. Referring to FIG. 1, reference symbols L1 through L99 denote logical blocks; and P1 through P56, physical blocks in a disk unit (disk drives). Assume that logical blocks L6, L4, L2, L12, L7, and L11 are to be updated. The old data of these logical blocks are present in physical blocks P6, P4, P2, P12, P7, and P11 in the disk unit. According to a general write method, the contents of physical blocks P6, P4, P2, P12, P7, and P11 are updated. According to a high-speed write method, however, while the data of physical blocks P6, P4, P2, P12, P7, and P11 are maintained, the new data of logical blocks L6, L4, L2, L12, L7, and L11 are written in physical blocks P51, P52, P53, P54, P55, and P56 as other prepared empty areas in bulk. With this operation, the number of writes (six writes are required in the general write method) can be reduced to three in the high-speed write method when, for example, two physical blocks are written in bulk, thereby attaining an improvement in write performance.

For the sake of descriptive convenience, in the example shown in FIG. 1, two physical blocks are written in one disk in bulk. In practice, however, several ten physical blocks are written in bulk. According to a RAID architecture of level 4 (RAID4 architecture) and a RAID architecture of level 5 (RAID5 architecture), since one stripe (N*K logical blocks; N is the number of drives, and K is the number of blocks) can be rewritten in bulk, no disk read is required for parity maintenance, and the overhead in a write can be reduced. According to the RAID4 architecture, data are arranged in large units such as sectors and blocks instead of small units such as bits and bytes, and each disk is independently operated in accordance with a request to read small-volume data. According to the RAID5 architecture, redundant data (parity data) is cyclically set in the respective data disks instead of being stored in a dedicated parity disk.

Since the latest data of logical blocks L6, L5, L2, L12, L7, and L11 are present in physical blocks P51 through P56 in the disk unit, the contents of an indirect map are rewritten to indicate correct disk positions. The data of logical blocks are read out after the latest disk positions are obtained by looking up this indirect map. No old data is therefore erroneously read out.

In the conventional high-speed write method described above, as shown in FIG. 1, a write buffer is prepared in a nonvolatile memory, the empty area in the disk unit is divided into blocks, and data are sequentially compacted/stored in the empty blocks through the write buffer. For this reason, even if contiguous data are to be read out, the data must be divided into blocks, and the addresses must be converted in units of blocks. When, therefore, a request to read data exceeding the data length of a logical block is sent from a host system, the requested data must be divided into a plurality of logical blocks.

In addition, every time data update processing is performed, in particular, a search for data to be updated in the entries corresponding to a buffer management table must be performed by using a conversion map. The processing time is therefore prolonged by the time required for this search. Furthermore, the conversion map is dependent on the storage capacity of the disk unit and must be created in the main memory of the system. This conversion map is therefore a factor that limits the capacity used by the main memory.

BRIEF SUMMARY OF THE INVENTION

It is an object of the present invention to improve performance associated with data update processing when a high-speed write method is applied to a disk storage system having particularly a RAID architecture.

The present invention relates to a scheme of executing read processing in accordance with a request to read contiguous data without theoretically dividing any logic block. The present invention also relates to a scheme of improving the efficiency of search processing of searching the entries of a conversion map corresponding to a buffer management table in data update processing.

More specifically, according to the present invention, there is provided a disk storage system constituted by N disk drives, comprising write buffer means having a storage capacity corresponding to N*K (K is an integer indicating the number of blocks) logical blocks, cache management means for managing the write buffer as a cache memory for storing read and write data to be transferred between the respective disk drives, and storing, in the write buffer, the logical blocks whose data lengths are changed, as needed, and data update means for delaying updating of logical blocks stored in the write buffer in data update processing until the number of stored logical blocks reaches N*K−1, creating a logical address tag block constituted by logical addresses of the respective logical blocks stored in the write buffer, selecting contiguous storage areas (in units of sectors) from empty areas different from areas of the respective disk drives in which old data to be updated are stored, and sequentially writing N*K logical blocks, obtained by adding the logical address tag block to the N*K−1 logical blocks, in the selected areas by a continuous write operation.

According to another aspect of the present invention, in the disk storage system, the data update means has a function of delaying updating of logical blocks stored in the write buffer in data update processing until the number of stored logical blocks reaches N*K−1, creating a logical address tag block constituted by logical addresses of the respective logical blocks stored in the write buffer, creating K parity blocks from N*K logical blocks obtained by adding the logical address tag block to the N*K−1 logical blocks, selecting contiguous storage areas (in units of sectors) from empty areas different from areas of the respective disk drives in which old data to be updated are stored, and sequentially writing N*K logical blocks having the parity blocks added thereto in the selected areas by a continuous write operation.

With this arrangement, when contiguous data are to be read out, an empty area of the write buffer in the nonvolatile memory need not be divided in units of logical blocks.

According to the present invention, since the data to be read out from the disk unit is divided into physically contiguous blocks to be compacted/stored in empty areas of the write buffer in the nonvolatile memory. With this scheme, addresses can be converted in bulk. An input/output request for a read need not be divided. In addition, since a conversion map can be created in the main memory instead of the nonvolatile memory independently of the capacity of the disk unit, the storage area of the main memory can be efficiently used by paging. If the present invention is applied to a disk storage system having a RAID architecture using a high-speed write method, the performance associated with data update processing, in particular, can be improved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 13 is a view showing an example of how logical address tag TG5 is created from logical address tags TG3 and TG4 in the stripe synthesis process in FIGS. 12A and 12B;

FIG. 14 is a view for explaining the arrangement of a conversion map in this embodiment;

FIG. 16 is a view for explaining the arrangement of a conversion map in this embodiment;

DETAILED DESCRIPTION OF THE INVENTION

An embodiment of the present invention will be described below with reference to the accompanying drawing.

Figure 2:
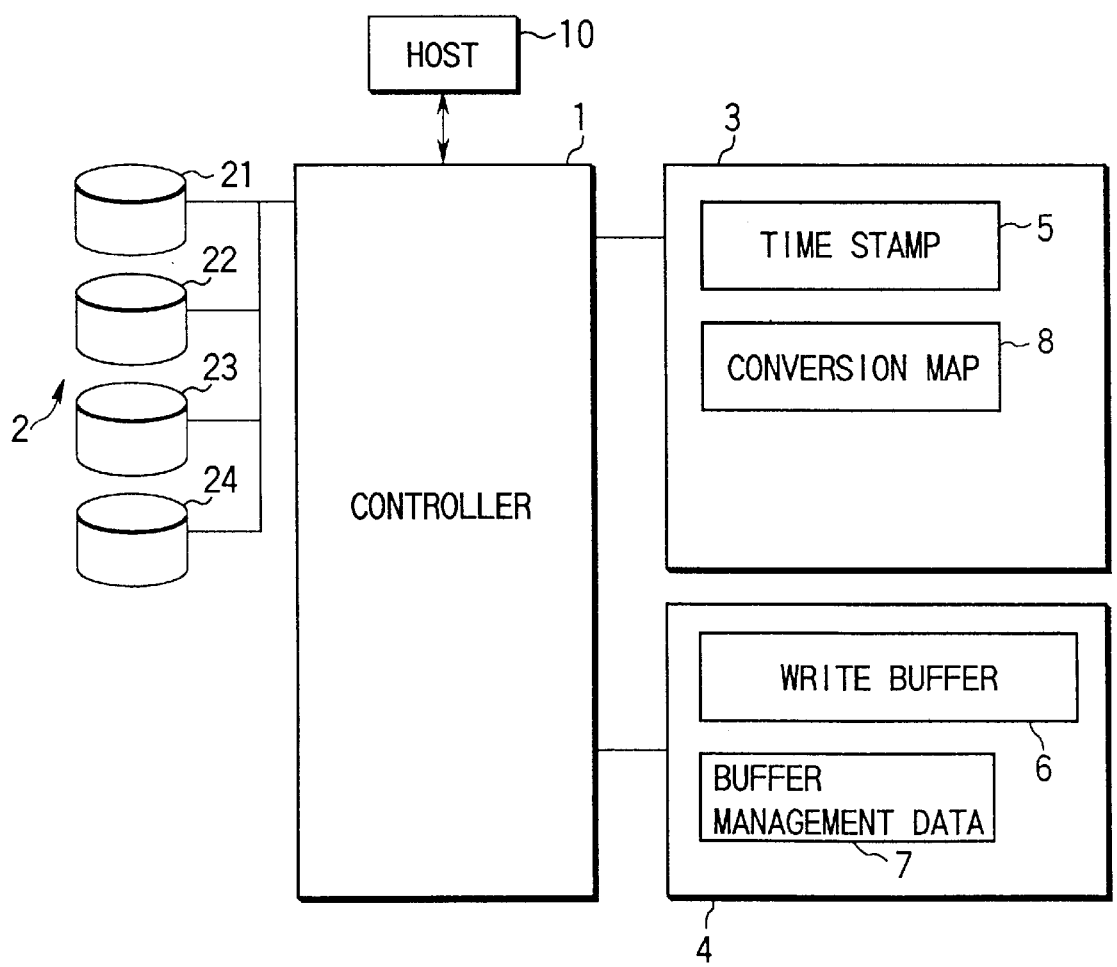
FIG. 2 is a block diagram showing the schematic arrangement of a disk storage system having a RAID architecture according to an embodiment of the present invention.
Figure 3:
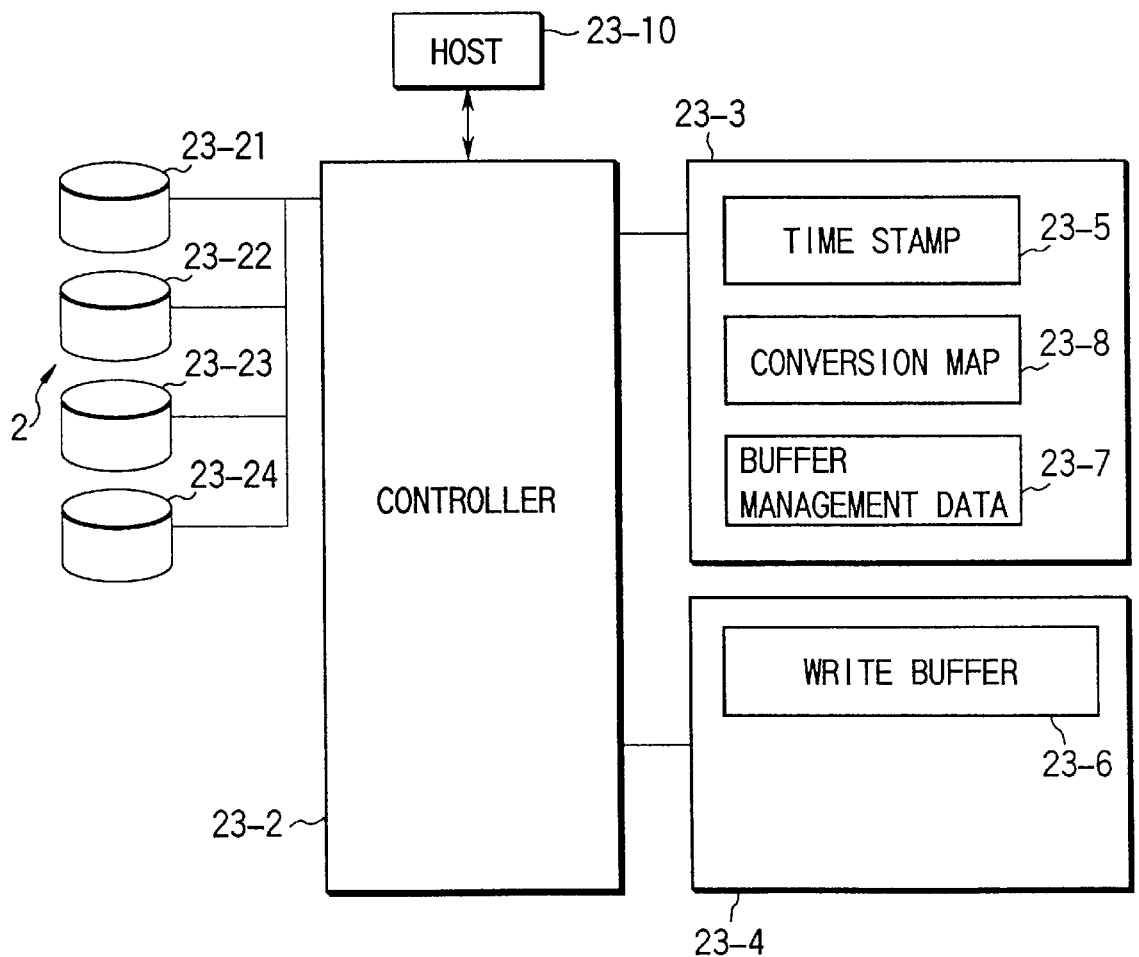
FIG. 3 is a block diagram showing the schematic arrangement of a disk storage system having a RAID architecture according to the embodiment of the present invention.

FIGS. 2 and 3 are block diagrams each showing the conceptual arrangement of a disk storage system having a RAID architecture according to this embodiment. The embodiment shown in FIG. 2 will be mainly described to explain the present invention in detail throughout the overall description about the present invention. Any person skilled in the art can execute the present invention even with system configurations originating from the systems shown in FIGS. 2 and 3. Referring to FIG. 2, for example, either a SCSI interface or PCI interface can be used as an interface between a host system 10 and a controller 1. In the system shown in FIG. 3, buffer management data 23-7 corresponding to a buffer management table 7 in FIG. 2 is stored in a main memory 23-3 corresponding to a volatile memory 3. The remaining constituent elements are the same as those of the system in FIG. 2.

(System Configuration)

As shown in FIG. 2, this system is constituted by the controller (CPU) 1, a disk unit 2 (disk drives 21, 22, 23, and 24), the volatile memory 3, and a nonvolatile memory 4. The volatile memory 3 contains a time stamp (a counter for counting the number of times of writes) 5 for maintaining a write time order and a conversion map 8 for converting a logical address into a physical address for accessing the disk unit 2. The nonvolatile memory 4 includes an area used as a write buffer 6 for holding the data to be written in the disk unit 2 upon converting it into a log file (a file system for writing data having the same address as that of preceding data in a location different from that of the preceding data, and managing the location) and an area for storing the buffer management data (buffer management table) 7. The buffer management data 7 is table data for managing the logical addresses of the write data held in the write buffer 6. The controller 1 manages the time stamp 5, the write buffer 6, and the buffer management data 7 to control the input/output of data to/from the disk unit 2.

(Relationship Between Write Buffer 6 and Buffer Management Data 7)

FIGS. 5 through 8 show the relationship between the write buffer 6 allocated to the nonvolatile memory 4 and the buffer management data 7.

In the system of this embodiment, the controller 1 divides the write data, for which a write request is generated by the host system 10, in units of blocks (write lengths) in accordance with the data length instead of immediately writing the data in the disk unit 2. The controller 1 then sequentially compacts and stores the data blocks in a log form. At this time, the controller 1 stores the logical addresses of the write data from the host system 10 in the entries, of the buffer management data 7, which correspond to the storage areas of the write buffer 6.

Flags (F, U, and C) indicating the states of entries are set in the entries of the buffer management data 7. Flag F indicates that data is allocated to the entry. Flag U indicates that the entry is not used. Flag C indicates that contiguous data is allocated to the next entry. By looking up the buffer management table 7, the controller 1 can determine the next storage position, in the write buffer 6, at which the write data received from the host system 10 is to be stored. According to the example shown in FIG. 5, write data are stored in buffer areas (storage positions) B0 through B7 of the write buffer 6. Reference symbols LA99, LA100, LA35, LA678, . . . , LA541 denote the logical addresses of the stored write data.

Assume that in this embodiment, write processing from the write buffer 6 to the disk unit 2 is performed in units of stripes, and read processing is performed in units of variable-length logical blocks. To execute write processing in N disk drives in units of stripes is to write the data of N*K (K is an integer indicating the number of blocks) logical blocks.

(Operation of Embodiment)

A process of writing data from the buffer into the disk unit 2 in unit of stripes will be described first with reference to FIGS. 4A and 4B.

Figure 4A:
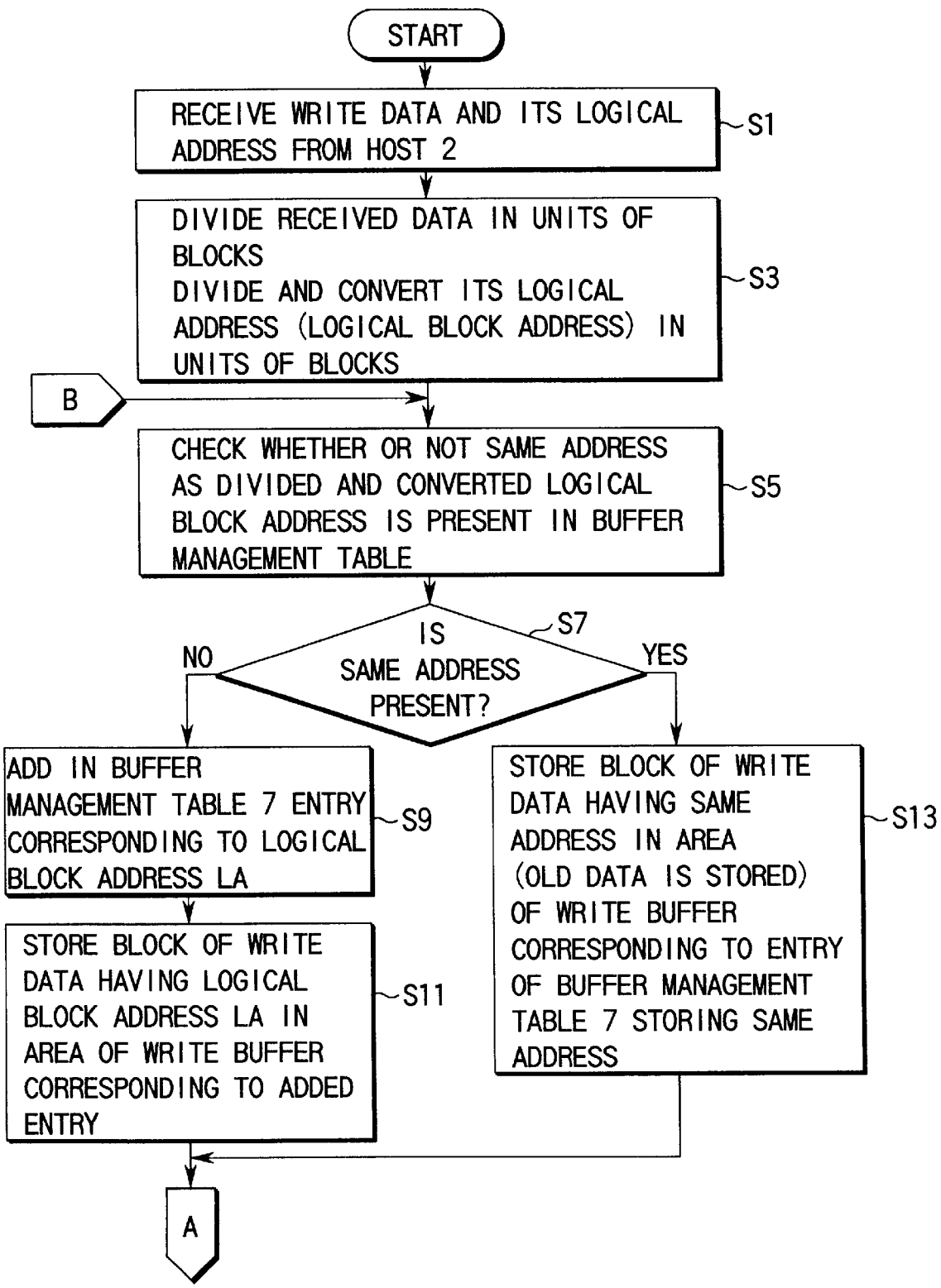
FIGS. 4A and 4B are flow charts showing a sequence for writing data blocks from a write buffer into disk drives in units of stripes.
Figure 4B:
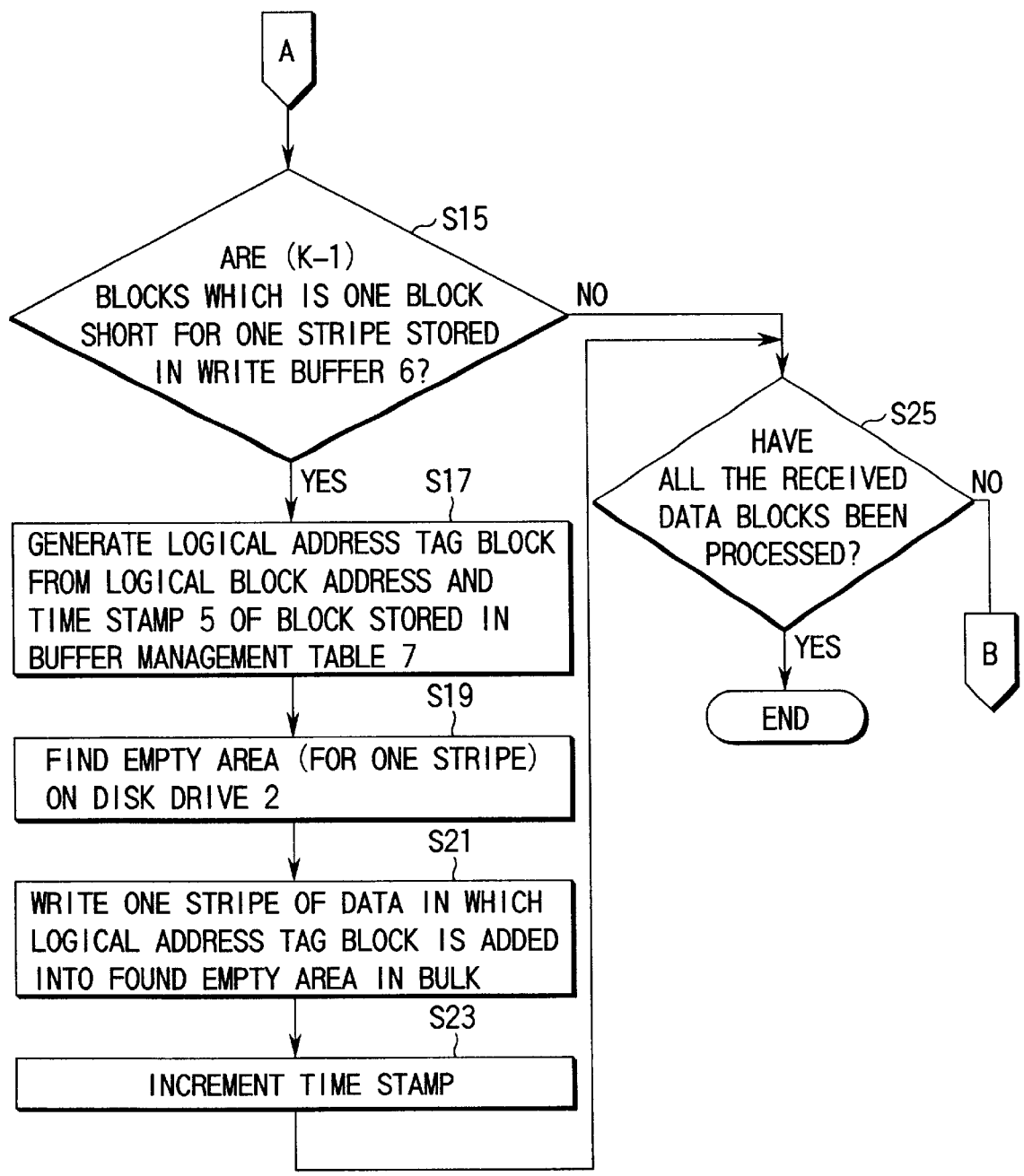

In step S1 in FIG. 4A, the controller 1 receives write data and its logical address from the disk unit 2. In step S3, the controller 1 divides the received data in units of blocks, and also divides/converts the logical address into addresses (logical block addresses) in units of blocks. In step S5, the controller 1 checks whether the same address as divided/converted logical block address LA is present in the buffer management table. In step S7, the controller 1 checks whether the same address is present. If YES in step S7, the controller 1 stores the write data block having the same address in the area (in which old data is stored), of the write buffer 6, which corresponds to the entry, of the buffer management table, in which the same address is stored. The flow then advances to step S15.

If NO in step S7, the controller 1 adds an entry corresponding to logical block address LA to the buffer management table 7. In step S11, the controller 1 stores the write data block having logical block address LA in the area, of the write buffer 6, which corresponds to the added entry. In step S15, the controller 1 checks whether (K−1) blocks which are smaller in number than the blocks of one stripe by one are stored in the write buffer 6. If YES in step S15, the controller 1 generates a logical address block from the logical address and time stamp 5 of the block stored in the buffer management table 7. In step S19, the controller 1 finds an empty area (for one stripe) in the disk unit 2. In step S21, the controller 1 writes one-stripe data, to which the logical address block is added, in the found empty area in bulk. In step S23, the controller 1 increments the time stamp 5. The flow then advances to step S25. In step S25, the controller 1 checks whether all the received data blocks have been processed. If YES in step S25, the write processing is terminated. If NO in step S25, the processing in steps S5 through S25 is repeated until all the blocks are processed.

An operation to be performed when a write request is generated by the host system 10 for the logical block located at a preceding logical address with respect to the data of a logical block stored in the write buffer 6 will be described next with reference to FIG. 5. In this embodiment, for the sake of descriptive convenience, the write buffer is assumed to be a shared buffer serving as both write and read buffers. However, no problems are posed even if they are independent buffers. Obviously, in this case, the read buffer may be either a volatile or nonvolatile memory.

Figure 6:
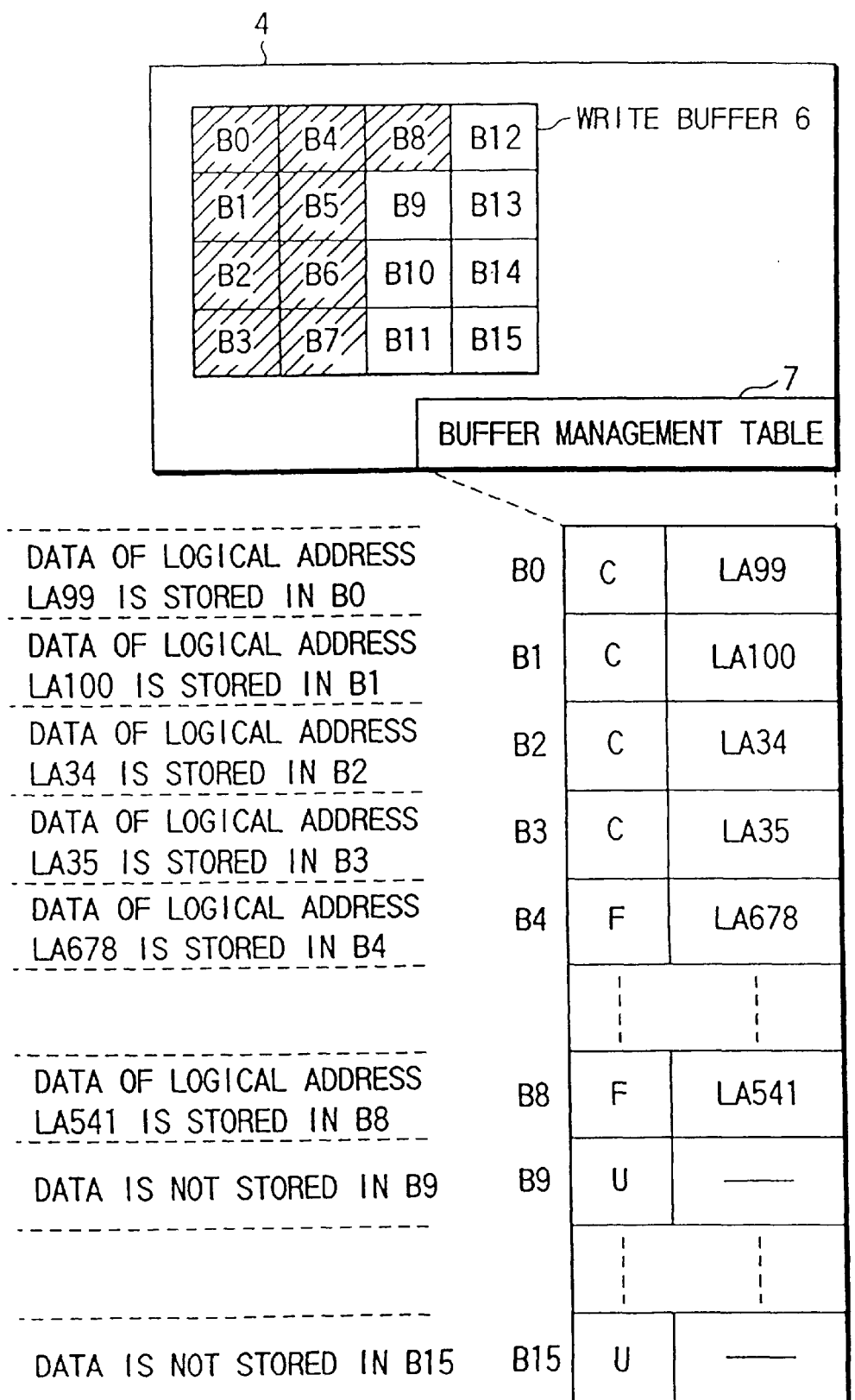
FIG. 6 is a view showing the relationship between the write buffer and the buffer management data in this embodiment.

If the write data for which the write request is generated by the host system 10 corresponds to logical address LA34, the controller 1 looks up the buffer management table 7 to recognize buffer area B8 of the write buffer 6 as an area in which data can be written (flag U indicating that no data is currently stored). In this case, the controller 1 moves storage-positions (buffer areas) on the write buffer 6 to allocate contiguous buffer areas as write logical addresses, and determines buffer area B2 as the storage position. That is, as shown in FIG. 6, the controller 1 stores the data of logical address LA34 in buffer area B2, and sequentially moves the buffer areas up to buffer area B8, thus storing the data therein. An operation to be performed when a write request for crossing two logical blocks is generated in update processing for the data of a logical block stored in the write buffer 6 will be described next.

Figure 5:
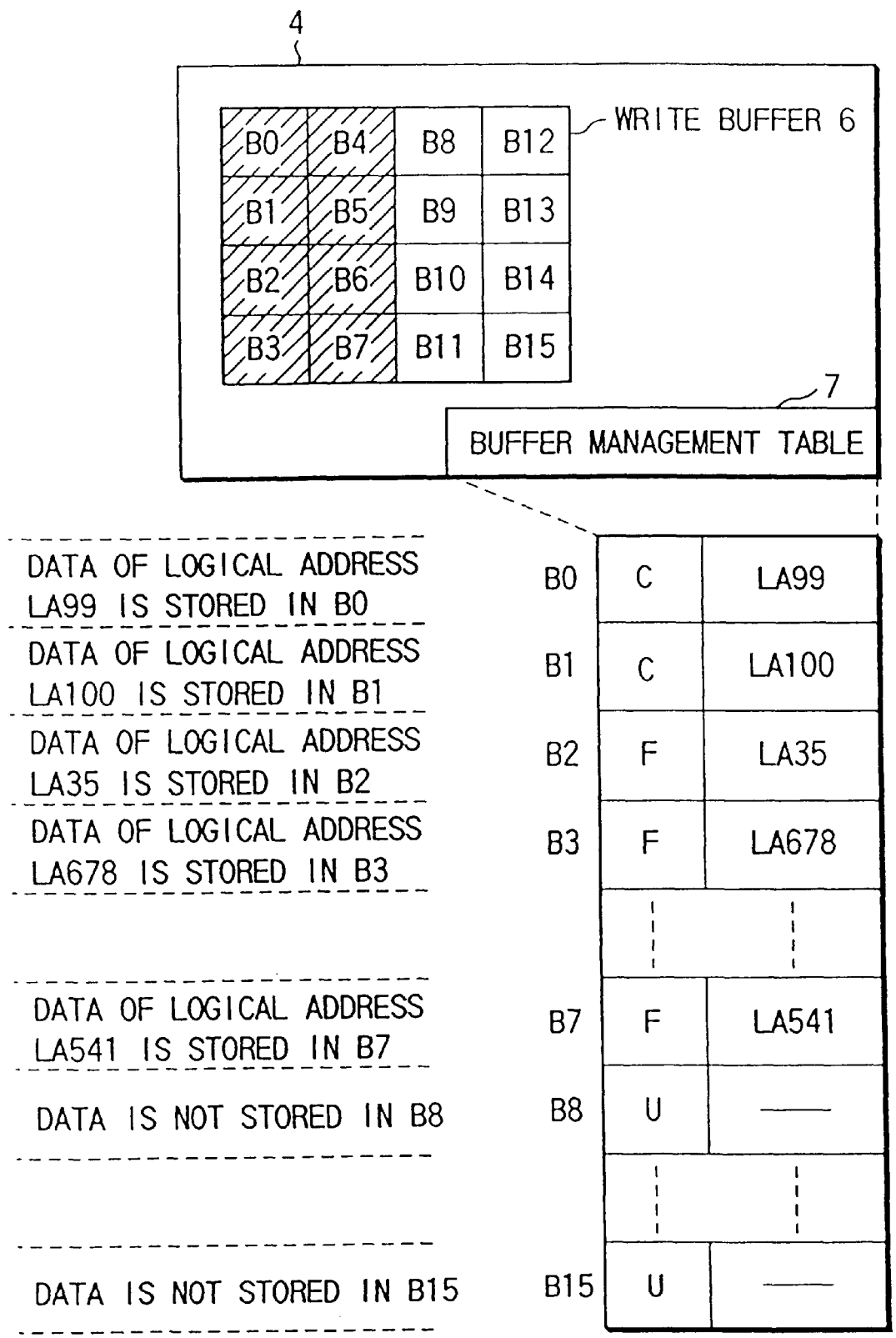
FIG. 5 is a view showing the relationship between the write buffer and buffer management data in this embodiment.
Figure 7:
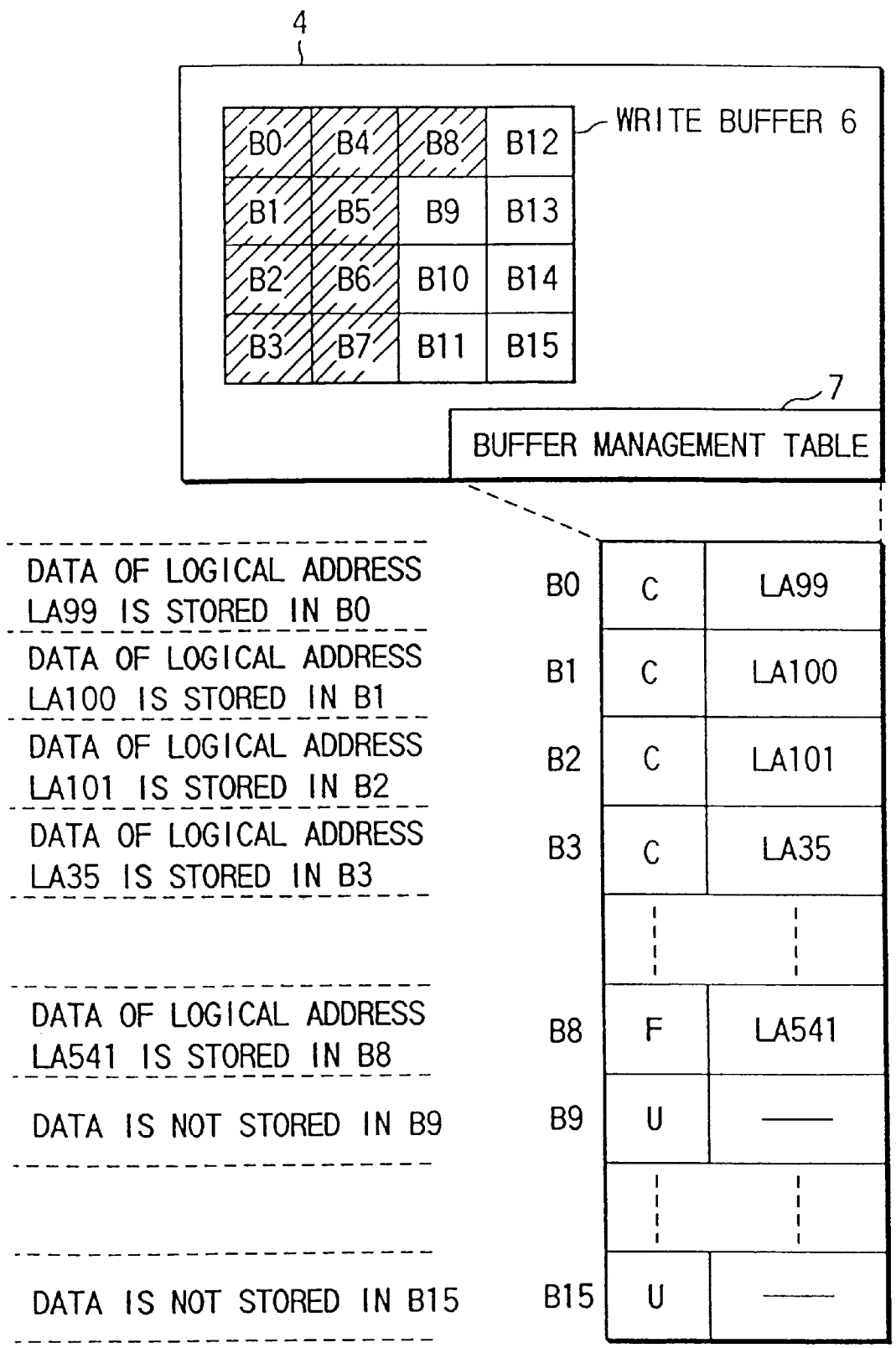
FIG. 7 is a view showing the relationship between the write buffer and the buffer management data in this embodiment.

When the write data for which the write request is generated by the host system 10 corresponds to logical address LA100, the controller 1 looks up the buffer management table 7 in FIG. 5 to recognize writable buffer area B8 and buffer area B1 corresponding to logical address LA100. In this case, since the data update processing is performed across two logical blocks, a buffer area corresponding to logical address LA101 corresponding to an increase in the data size of logical address LA100 must be allocated. In this case, contiguous buffer areas are allocated as physical blocks in a stripe in delayed write processing in units of stripes. If this block movement is minimized, the update processing can be efficiently performed. With this data update processing, the state shown in FIG. 7 is obtained.

An operation to be performed to set contiguous physical addresses when a read request is generated for two blocks with contiguous logical addresses but the corresponding physical addresses are not contiguous will be described.

Figure 8:
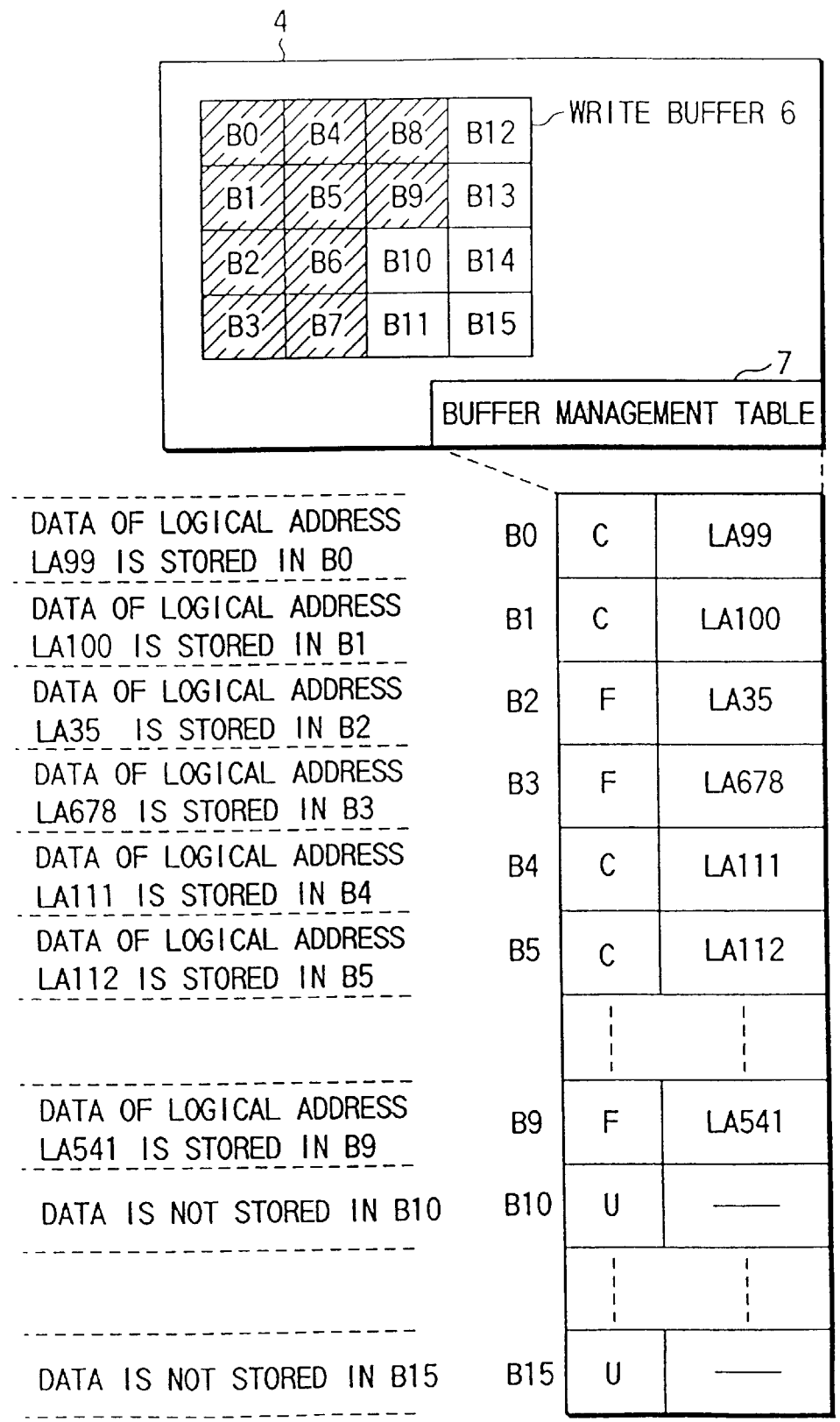
FIG. 8 is a view showing the relationship between the write buffer and the buffer management data in this embodiment.

When the host system 10 generates a read request with respect to logical addresses LA111 and LA112, the controller 1 looks up the buffer management table 7 in FIGS. 5 and 6 to determine buffer area B8 as a next writable area and buffer areas B4 and B5 as areas which allow allocation of buffer areas having contiguous logical addresses. In this case, since it is assumed that data corresponding to logical addresses LA111 and LA112 are set in different stripes in the disk unit 2, read processing must be performed twice. These blocks are therefore set as contiguous blocks in a single stripe. With this operation, after this stripe is written, a read request may be generated for the disk unit 2 to execute read processing for the contiguous physical blocks in the single stripe only once. With this write processing, the state shown in FIG. 8 is obtained.

The above description concerns the relationship between the write buffer 6 and the buffer management table 7. In the examples shown in FIGS. 5 through 8, the data defined by the contiguous logical addresses in read or write processing for the write buffer 6 are rearranged such that the corresponding physical addresses are also become contiguous. All the data in the write buffer 6 may be rearranged in the logical address order depending on the data transfer performance of the computer system. In addition, instead of rearranging the data, the system may use a list indicating the write order of data from the write buffer 6 into the disk unit 2 and change the order in the list without moving the data.

Each of the disk drives 21 through 24 of the disk unit 2 executes write processing in bulk in a predetermined unit (preferably a size near the length of one track on a disk) called a stripe unit having a size of an integer multiple (K) of the block size. In this case, stripe units at identical physical positions in the disk drives 21 through 24 are written as one stripe at the same timing. The host system 10 regards the disk unit 2 as a disk unit having a capacity smaller than the total storage capacity of the disk drives 21 through 24. More specifically, when the host system 10 inquires about the storage capacity of the disk unit 2 in an initial period, the controller 1 responds with a storage capacity smaller than the actual storage capacity. This is because the controller 1 ensures an empty area for the above compaction. The disk storage system can therefore ensure its own storage area other than the storage areas in/from which the host system 10 can logically perform writes and reads. This storage area will be referred to an empty area in this embodiment.

The time stamp 5 is data to be added to write data when the data is actually written in the disk unit 2, and is used to determine the data write order in the disk unit 2. Every time data from the write buffer 6 is written in the disk unit 2, the time stamp 5 is incremented.

(Write Operation of System)

Figure 1:
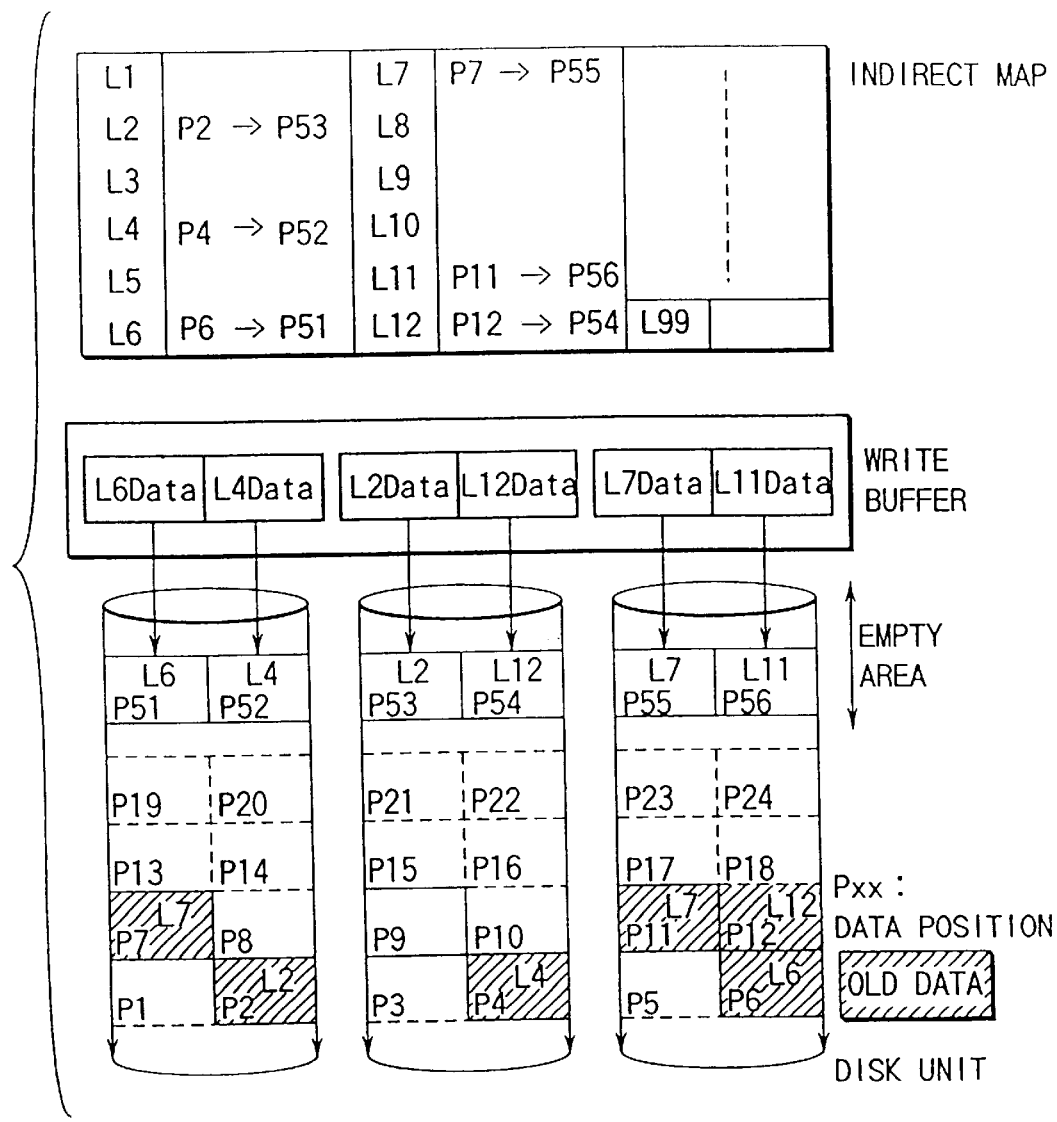
FIG. 1 is a view for explaining a data update method in a conventional disk storage system.
Figure 9:
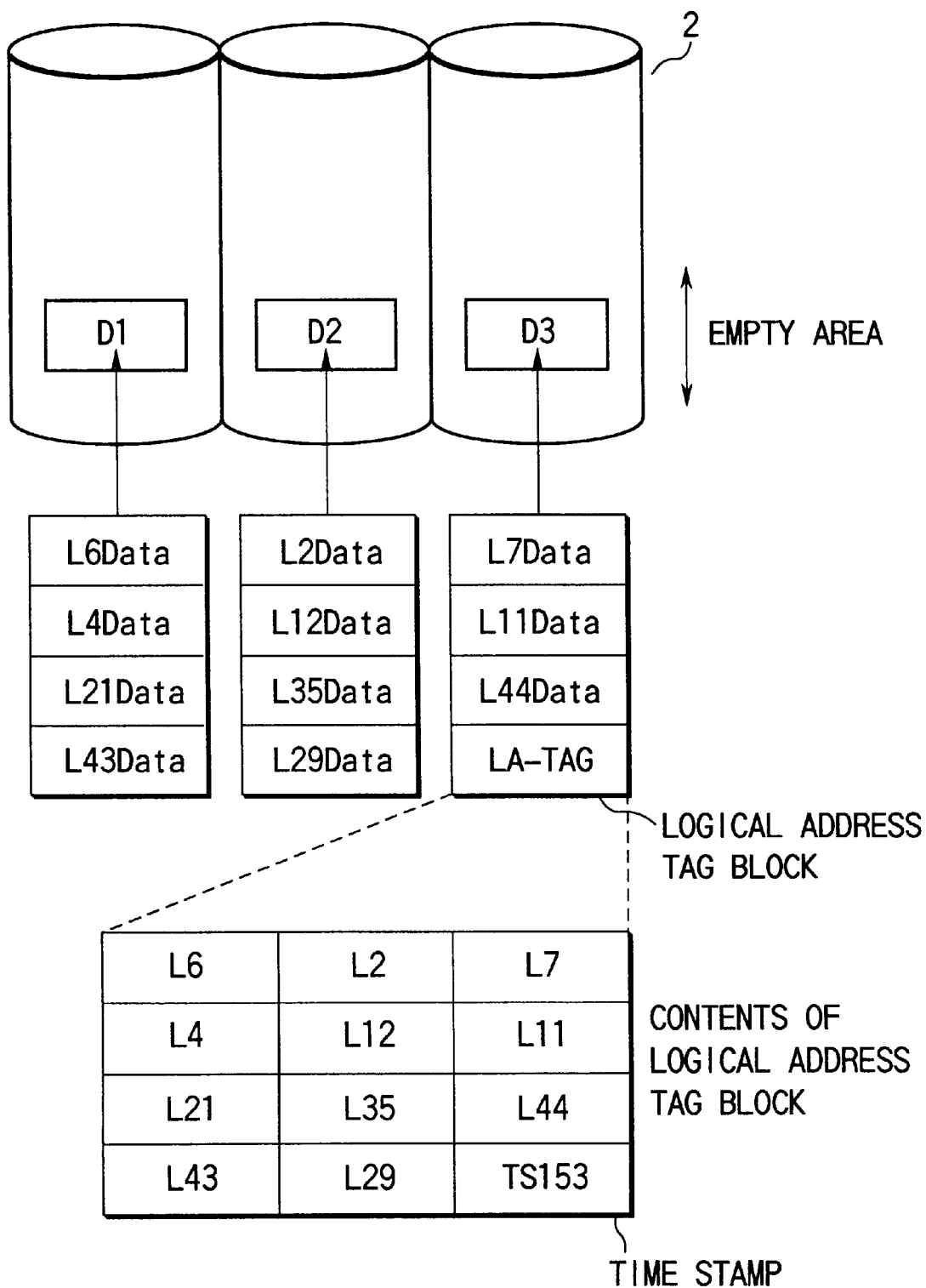
FIG. 9 is a view for explaining the contents stored in empty areas of the disk unit in a write in this embodiment.

The write operation of this embodiment in the system shown in FIG. 1 will be mainly described below with reference to FIG. 9.

Upon reception of write data and its logical address from the host system 10, the controller 1 divides the write data in units of blocks and compacts/stores the data blocks in empty areas of the write buffer 6 in the nonvolatile memory 4. The received logical address is converted into addresses in units of blocks to be stored in corresponding entries in the buffer management table 7. In these processes, the controller 1 compacts/stores the data at optimal storage positions of the write buffer 6 by looking up the received logical address and the data which have already been stored in the write buffer 6. When data which have already been stored in the write buffer 6 are to be updated, the controller 1 directly writes the new data in the corresponding areas to update the old data instead of compacting/storing the new data in empty areas of the write buffer 6.

When (N*K−1) blocks, of the write data from the host system 10, which are smaller in number than the blocks of one stripe by one are stored in the write buffer 6, a logical address tag block is generated as the last write block from the logical addresses of the respective blocks stored in the buffer management table 7 and the time stamp 5 in the volatile memory 3. The address data and the data blocks in this logical address tag block are set in a one-to-one correspondence. The logical addresses of the respective blocks can therefore be known.

Subsequently, the controller 1 simultaneously writes one-stripe data having the logical address tag block added thereto in empty areas of the disk drives 21 through 24 in bulk. As described above, since the write blocks in one stripe constitute a contiguous area with respect to the logical addresses, the latest data is contiguously set in the same stripe. The read performance therefore improves. FIG. 9 shows such an operation.

The value of the time stamp 5 is incremented when the write processing is complete. Since many elaborate disk write operations can be executed in bulk at once, the disk write performance can be improved.

(Compaction in Data Update Processing)

Compaction in data update processing will be described next with reference to FIG. 10.

According to the method of storing new data and writing them in empty areas prepared in the disk unit 2 in bulk instead of directly rewriting the areas of old data, when data update processing is to be performed, empty areas must always exist. For this reason, data which have become ineffective when data have already been written in other areas must be gathered to form empty areas while no disk access is made by the host system 10. This processing is called compaction. The compaction is constituted by two processes, namely an ineffective block determination process and a stripe synthesis process.

Figure 10:
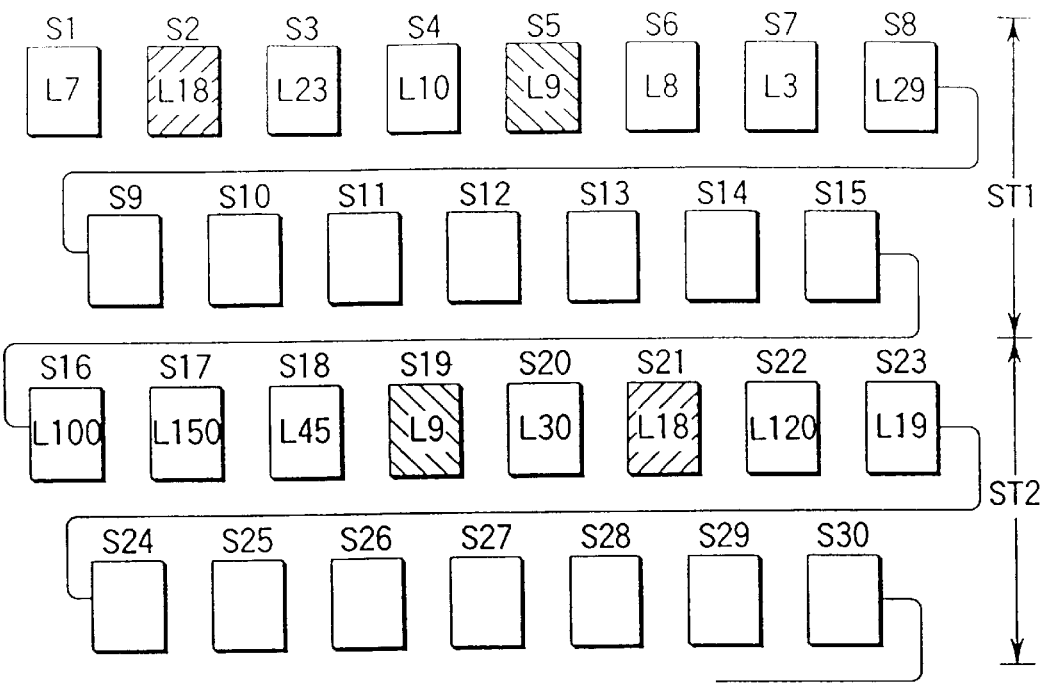
FIG. 10 is a view for explaining a compaction process in a write in this embodiment.

In an example of ineffective block determination processing, in executing a data write request from the host system 10, the write order in a one-block size is assumed as shown in FIG. 10. Referring to FIG. 10, "Lxx" such as L18 represents a logical block (logical address) sent from the host system 10, and "Sxx" such as S1 indicates an ordinal number in write processing. In this embodiment, the write buffer 6 can hold the data of 15 logical blocks. The first write data of S1 through S15 are compacted into one stripe (ST1). A time stamp T1 is added to this stripe. The resultant stripe is then written in empty areas of the disk unit 2. Similarly, the write data of S16 through S30 are compacted into another stripe (ST2). A time stamp T2 is added to this stripe. The resultant stripe is then written in other empty areas. Since the time stamp 5 is incremented every time write processing is performed, a relationship of T1<T2 is established.

As is obviously from FIG. 10, the data of logical addresses L9 and L18 are redundantly present as the data of S5 and S2 in the stripe of the time stamp T1 and as the data of S19 and S21 in the stripe of the time stamp T2. In consideration of the order in which the data were written, it must be determined that the data blocks of S19 and S21 are effective, but the data blocks of S5 and S2 are ineffective. In this case, however, for the sake of descriptive convenience, the ordinal numbers "Sxx" indicating the old data are not recorded on the actual disk.

Figure 11:
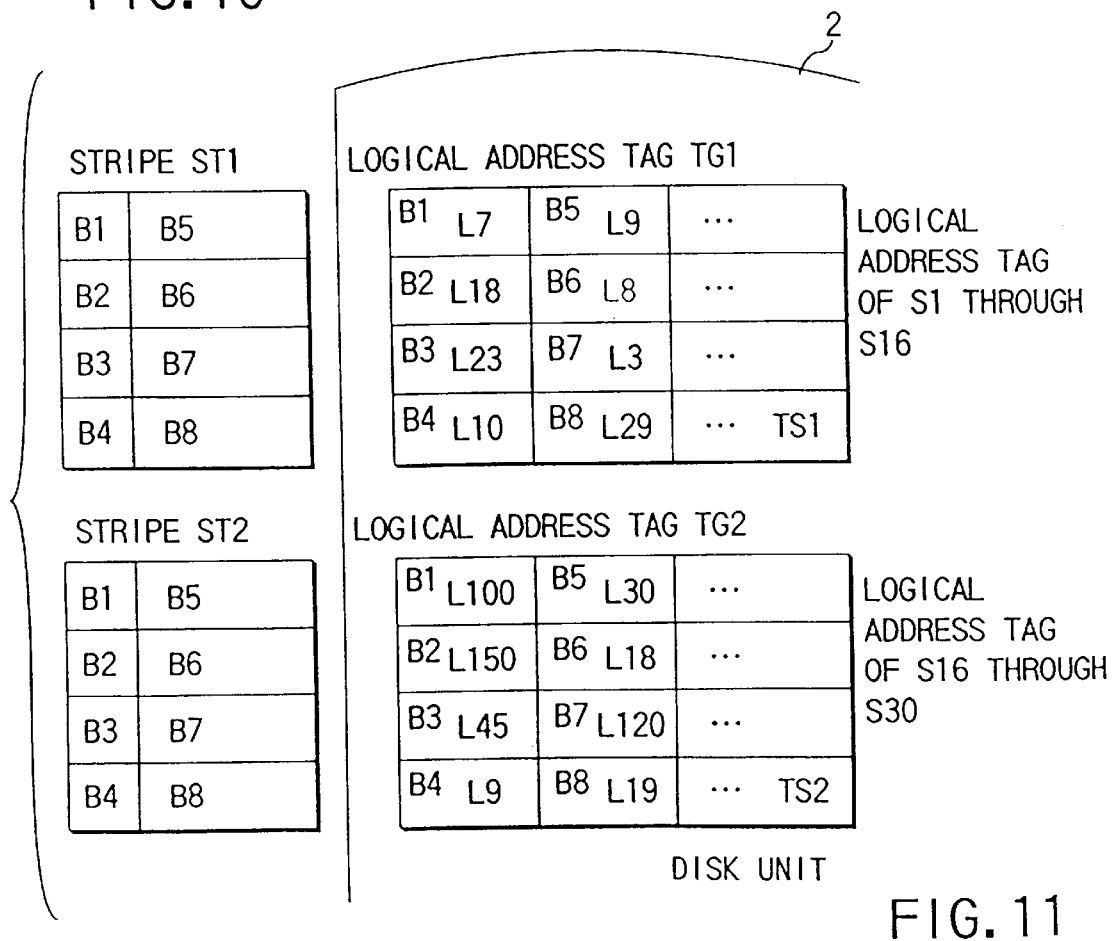
FIG. 11 is a view showing the contents of logical address tags TG1 and TG2 of stripes ST1 and ST2 in the example shown in FIG. 10.

This ineffective block determination process is performed by using the logical address tags in a stripes. In the example shown in FIG. 10, logical address tags TG1 and TG2 in two stripes ST1 and ST2 have the contents shown in FIG. 11. As is obvious from FIG. 11, two logical address tags TG1 and TG2 include the data of identical logical blocks L9 and L18.

Either the data of blocks B5 and B2 in stripe ST1 or the data of blocks B4 and B6 in stripe ST2 are ineffective. Logical address tag TG2 includes logical blocks L18 and L19 as effective data. Whether given data is effective is determined by checking on the basis of the time stamp whether the data is the latest data. In addition, when time stamp T1 of logical address tag TG1 is compared with time stamp T2 of logical address tag TG2, a relationship of T1<T2 is satisfied. It can therefore be determined that blocks B5 and B2 in stripe ST1 are ineffective. By looking up the logical address tags in the disk unit 2 in this manner, ineffective data blocks can be found. The buffer for such read/write processing required for this processing is preferably used independently of the write buffer 6 to attain an improvement in performance. Obviously, the write buffer 6 may serve as both the buffers.

Figure 12A:
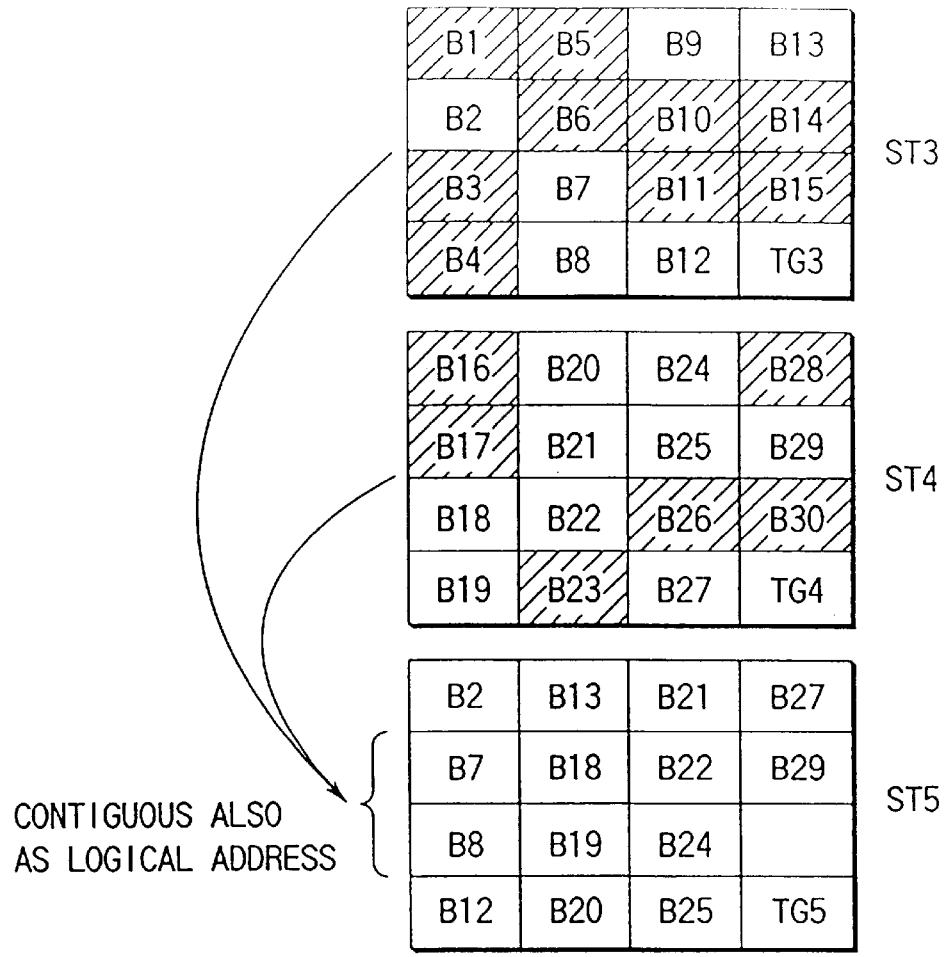
FIGS. 12A and 12B are views for explaining a stripe synthesis process in the example shown in FIG. 10.
Figure 12B:
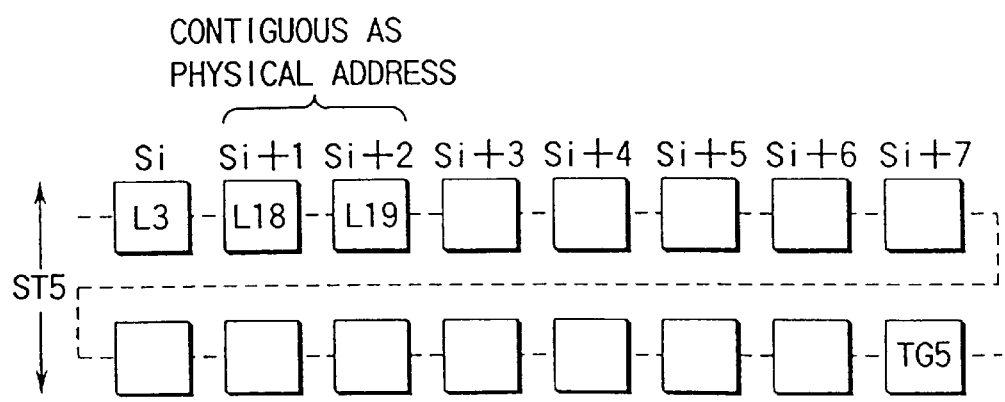

An example of the stripe synthesis process will be described below. Assume that two stripes ST3 and ST4 are to be synthesized into one stripe ST5, as shown in FIGS. 12A and 12B. As shown in FIG. 12A, six blocks, i.e., blocks B2, B7, B8, B9, B12, and B13 are effective in stripe ST3, but the nine remaining blocks are ineffective (indicated by hatching). Similarly, nine blocks, i.e., blocks B18, B19, B20, B21, B22, B24, B25, B27, and B29, are effective in stripe ST4, but the six remaining blocks are ineffective (indicated by hatching). In this case, since the total number of effective blocks in the two stripes is only 15, two blocks are synthesized into one block to produce one empty area.

In stripe synthesis, as shown in FIG. 12A, two stripes ST3 and ST4 are loaded into the volatile memory 3, and only the effective blocks are compacted and transferred to the write buffer 6. In this case, the effective blocks in stripes ST3 and ST4 are arranged such that the logical addresses become contiguous.

With this operation, the blocks in synthetic stripe ST5 can hold data contiguous in both the logical addresses and the physical addresses. Accordingly, as shown in FIG. 13, only the logical addresses of the effective blocks are shifted from logical address tags TG3 and TG4 to corresponding positions to create new logical address tag TG5, and the time stamp 5 is updated at this time. As is obvious from FIG. 13, pairs of logical blocks (addresses) L13 and L14 and L22 and L23 included in new logical address tag TG5 are contiguous areas in terms of the logical addresses as well. That is, logically and physically contiguous areas are ensured.

When 14 effective blocks are assumed as in this example, a stripe having one write block from the host system 10 is completed, and the data are written in empty areas of the disk unit 2 in bulk. At this time, no problems are posed even if the logical addresses are rearranged. In this case, the disk areas can be effectively used. If, however, a disk access is made from the host system 10 in the burst mode, since write processing is waited, excessive disk addresses are likely to be made. For this reason, the last data block may be kept empty to allow data to be written therein while no disk access is made. In this case, no problems are posed even if a NULL address such as "−1" is set as a logical address corresponding to the last data block in logical address tag TG5 to indicate the absence of data, and the logical addresses of the data blocks in which data are stored are rearranged.

A process of reading written data blocks will be described next.

When the effective block determination process in the above compaction is performed for the logical address tags of all the stripes in the disk unit 2, the physical positions of the effective blocks with respect to all the logical addresses can be detected. Theoretically, therefore, the physical blocks to be read out can be found by checking all the stripes every time the logical address of a read block is received from the host system 10. This method, however, demands an enormous period of time for block read processing and hence is not practical.

The conversion map 8 for conversion from logical addresses into physical addresses is therefore created in the volatile memory 3 by checking the logical address tags of all the stripes only when the system is started. This will obviate the need to always check logical address tags without greatly degrading the read performance. In addition, since the conversion map 8 can be reproduced at any time by checking all stripes, this map need not be stored in the nonvolatile memory 4 to prepare for a power supply failure as in the prior art.

(Arrangement of Conversion Map)

The arrangement of the conversion map 8 in this embodiment will be described below with reference to FIGS. 14 through 17.

As shown in FIG. 14, the conversion map 8 is table data in which stripe numbers ST# indicating stored blocks corresponding to the respective logical addresses, block numbers BLK# in the corresponding stripes, and time stamps TS# are held in the form of a table. The controller 1 looks up the conversion map 8 with logical addresses L0 to Ln to obtain actual physical addresses from stripe numbers ST# and block numbers BLK#.

Figure 15A:
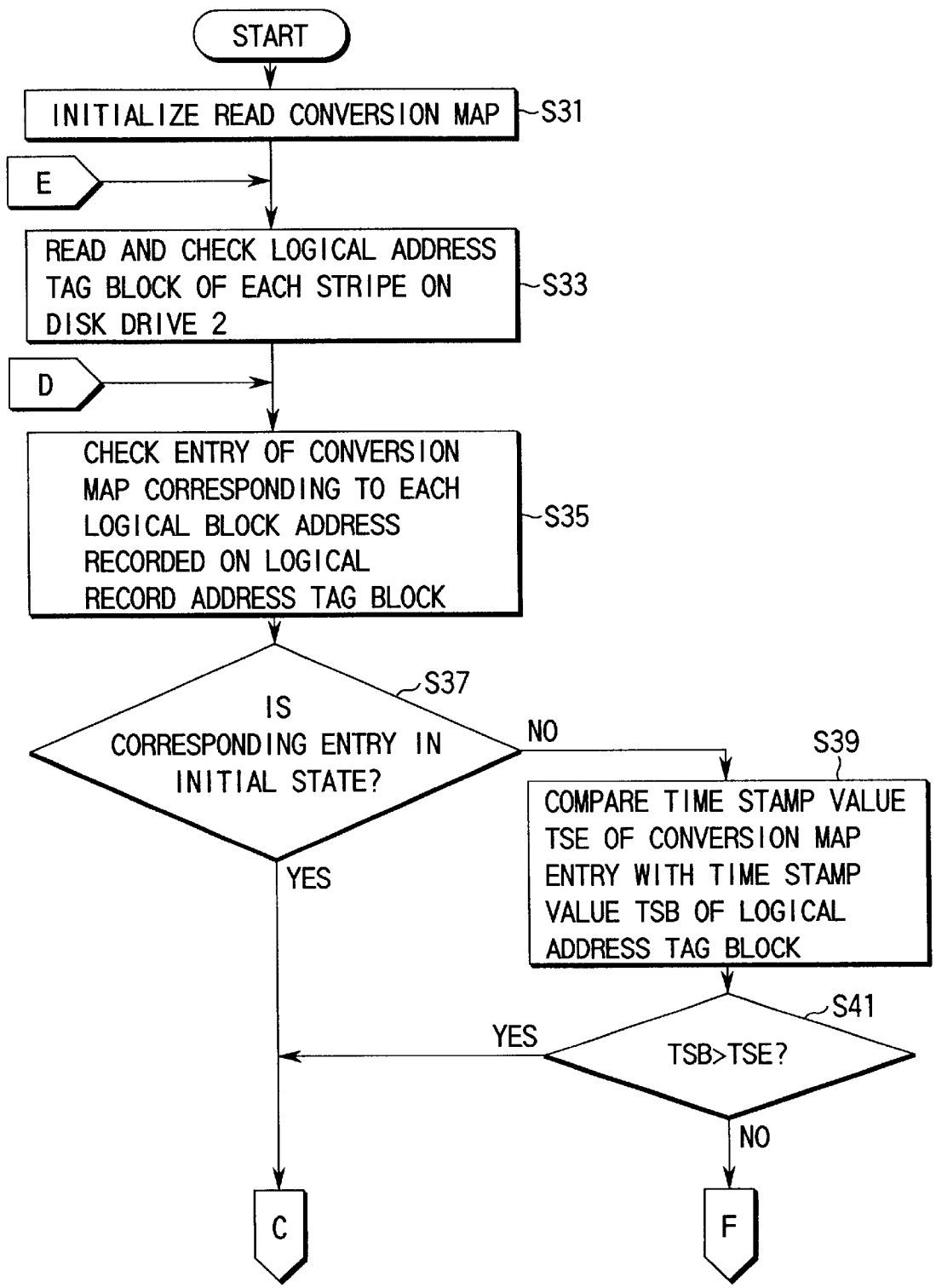
FIGS. 15A and 15B are flow charts showing a sequence for creating a read conversion map.
Figure 15B:
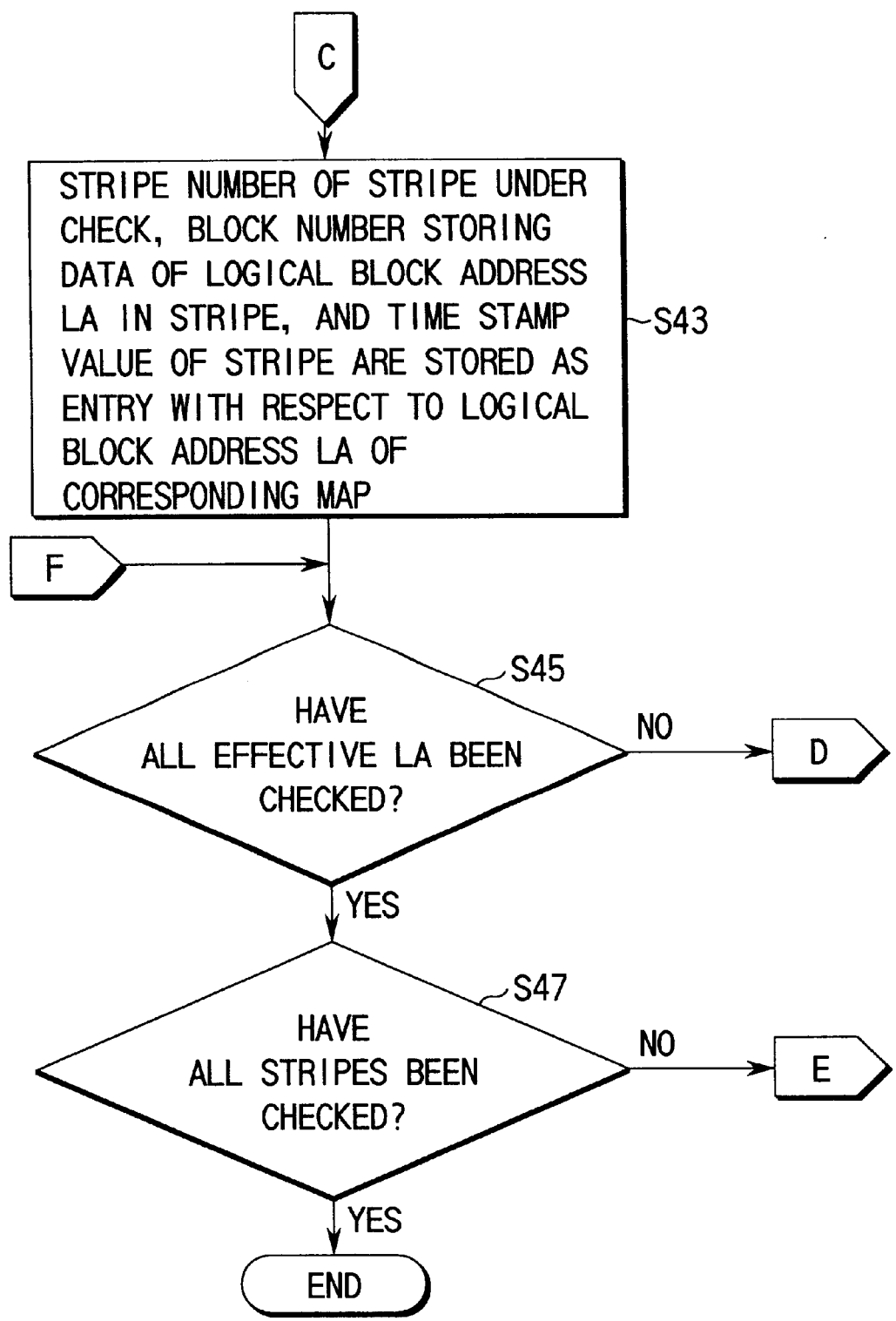
Figure 17:
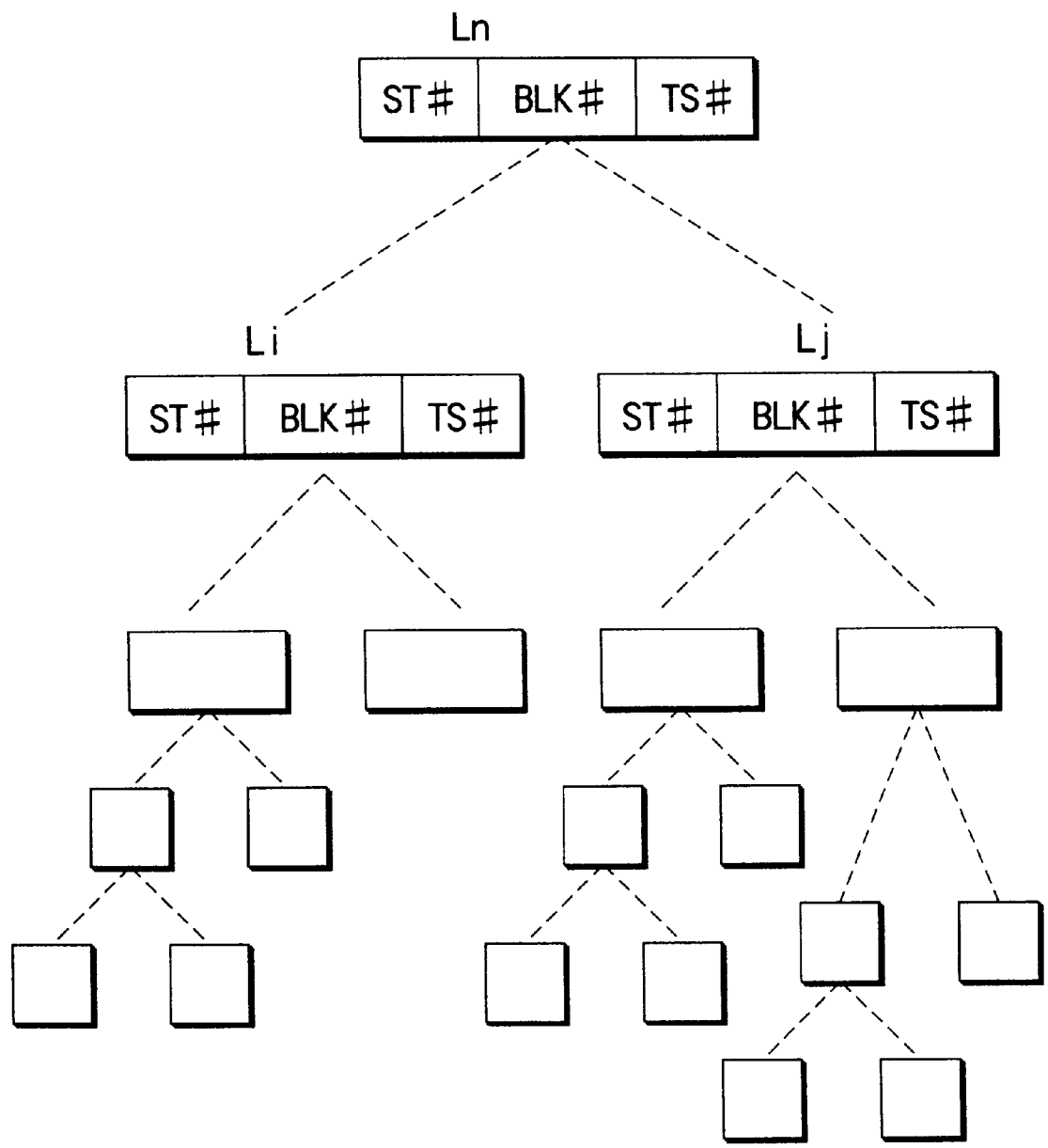
FIG. 17 is a view for explaining the arrangement of a conversion map in this embodiment.

FIGS. 15A and 15B are flow charts showing a process of creating a read conversion map. Referring to FIG. 15A, in step S31, the controller 1 initializes the read conversion map. In step S33, the controller 1 reads and checks the logical address tag block of each stripe in the disk unit 2. In step S35, the controller 1 checks the entry, of the conversion map, which corresponds to each logical block address LA recorded on the read logical address tag block. In step S37, the controller 1 checks whether the corresponding entry is in the initial state. If it is determined in step S37 that the corresponding entry is in the initial state, the controller 1 stores, as the entry corresponding to logical block address LA of the conversion map, the stripe number of the stripe under check, the block number indicating the data of logical block address LA in the stripe, and the time stamp value of the stripe.

In contrast to this, if it is determined in step S37 that the corresponding entry is not in the initial state, the controller 1 compares a time stamp value TSE of the conversion map entry with a time stamp value TSB of the logical address tag block in step S39. In step S41, the controller 1 checks whether the time stamp value TSB of the logical address tag block is larger than the time stamp value TSE of the conversion map entry. If YES in step S41, the controller 1 executes the above processing in step S43. If NO in step S41, the flow advances to step S45. In step S45, the controller 1 checks whether all effective logical block addresses LA have been checked. If NO in step S45, the flow returns to step S35 to repeatedly execute steps S35 through S45. If YES in step S45, the controller 1 checks in step S47 whether all the stripes have been checked. If it is determined in step S47 that not all the stripes have been checked, the flow returns to step S33 to repeatedly execute steps S33 through S47. If it is determined in step S47 that all the stripes have been checked, the creation of this read conversion map is terminated.

When this system is started, the logical address tags of all the stripes are checked to detect ineffective blocks in all the stripes in the disk unit 2. A stripe synthesis process is then executed for all the stripes. In this case, the contiguity of logical addresses is checked from stripe numbers ST# indicating the stored blocks corresponding to the respective logical addresses, bock numbers BLK# in the corresponding stripes, and time stamps TS#, and stripe numbers ST# and block numbers BLK# are rearranged to be as contiguous as possible. This operation decreases the possibility that when contiguous data are to be read, the data have different stripe numbers ST#, or the data having identical stripe numbers ST# have discontinuous block numbers BLK#. As is obvious from the relationship between the write buffer 6 and the buffer management table 7, a plurality of blocks can be read at once in response to a read request, instead of reading data in units of blocks, thereby suppressing degradation in performance.

In the example of the conversion map in FIG. 14, when an access is to be made to the disk unit 2 for write or update processing, all the entries of the conversion map 8 are looked up. In this method, all the entries must be searched, and the overall conversion map 8 must be exclusively controlled during the search. Owing to such limitations, efficient address conversion cannot be performed by this method. To realize efficient address conversion, a conversion map having hash keys as logical addresses (see FIG. 16) or a conversion map for searching logical addresses through binary tree search (see FIG. 17) is preferably created. By using such a conversion map, efficient address conversion can be performed.

A conversion map having hash keys as logical addresses is created such that the entry of a frequently used logical address is set at the head of a hash list. This improves update performance in updating read data. When a conversion map having a tree structure is to be created, a root logical address must be determined in consideration of the search time. The example shown in FIG. 17 has a tree structure with binary tree using the intermediate values of logical addresses which can be handled in the computer system. However, a tree structure with n-ary tree can also be employed.

A conversion map is created on the basis of all the logical addresses of checked logical address tags as follows when the system is started. Only when the time stamp 5 of a logical address tag is larger than the time stamp 5 of the table, block number BLK# corresponding to stripe number ST# is registered in a table, hash list, or tree structure in accordance with each type of conversion map. If this check is performed on all the stripes, a conversion map indicating only effective blocks is created. In this case as well, the execution of a process similar to a stripe synthesis process decreases the possibility that when contiguous data are to be read, the data have different stripe numbers ST#, or the data having identical stripe numbers ST# have discontinuous block numbers BLK#. Degradation in performance can therefore be prevented. In addition, if the same process as described above is performed for each logical address tag every time a stripe is written in the disk unit 2, this conversion map always indicates effective blocks. By comparing/checking the logical address tag of each stripe with the conversion map while no disk access is made, discrete data can be synthesized into a single stripe or contiguous blocks. Furthermore, even if this conversion map indicates an incorrect value owing to a memory failure or the like, this state can be detected.

The above conversion map 8 demands the time stamp 5 required to maintain the time order in write processing and a storage capacity for the volatile memory 3 for address conversion from logical addresses into physical addresses in accordance with the storage capacity of the disk unit 2. For this reason, if the disk unit 2 has a large storage capacity, a large capacity is required for the volatile memory 3 in the main memory, posing a problem in terms of practicality. If, therefore, part of an indirect map for managing the positional information of latest data is stored in an empty area in the disk unit, and the data to be converted and its logical address are not present in the indirect map, the indirect map is read out from the empty area in the disk unit 2 to re-create an indirect map. In this manner, an effective operation can be performed.

Re-creation of an indirect map will be described below. The scheme of reading out an indirect map from the disk unit to re-create an indirect map every time a logical address is converted into a physical address is becoming unacceptable in terms of the performance of the computer system. It is therefore important to prevent highly frequent generation of read requests with respect to part of the indirect map stored in the disk unit. For this purpose, an optimal indirect map is created by storing data in the disk unit 2 in the chronological order of the time stamps of the entries, of the indirect map, which correspond to the respective logical addresses.

As described above, a check on each logical address tag is an element of the process of creating the conversion map 8. If, therefore, the number of logical address tags is large as in the large-capacity disk unit 2, a long period of time is required to create a conversion map when a power supply failure occurs or the system is started. If logical address tag blocks like those in FIG. 5 concentrate on one disk drive 24, accesses concentrate on the disk drive 24 when the system is started. As a result, checks on logical address tags cannot be concurrently performed. If, therefore, logical address tags are separately stored in four disk drives in units of stripes, and the logical address tags are concurrently checked, the time required to create this conversion map can be shortened to ratio 1 to 4.

(Divisional Segment Management)

Figures 18, 19:
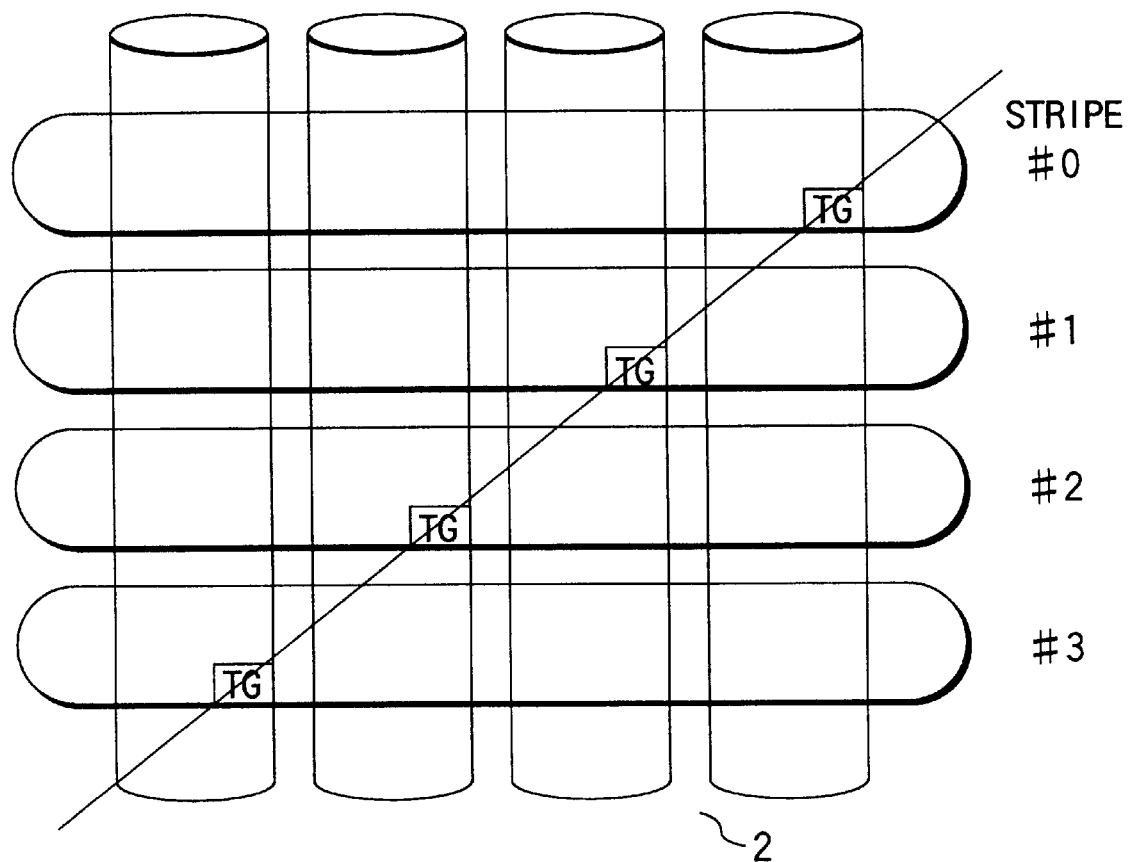
FIG. 18 is a view for explaining an example of how logical address tags according to this embodiment are separately arranged.
FIG. 19 is a view for explaining divisional segment management according to this embodiment.
Figure 20:
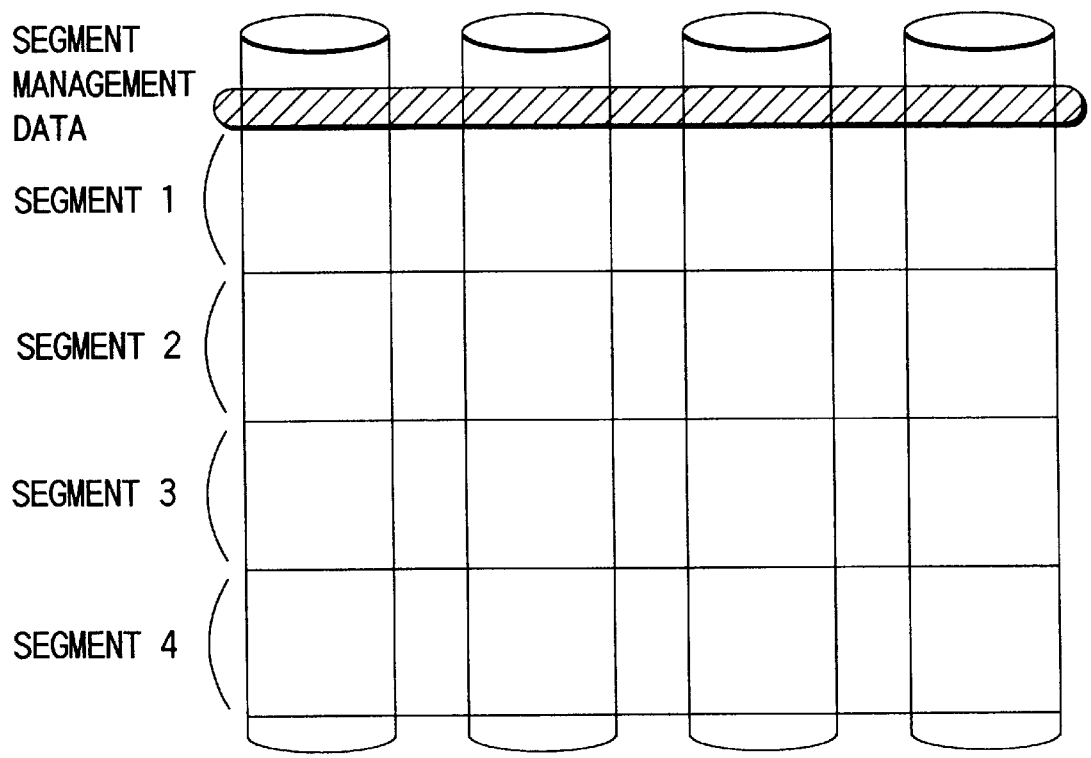
FIG. 20 is a view for explaining divisional segment management according to this embodiment.

FIGS. 19 and 20 show a divisional segment management scheme of dividing the storage area of the disk unit 2 into a plurality of segments and managing the segments. With this scheme, the number of checks on logical address tags required to create the conversion map 8 can be decreased. FIG. 20 shows the arrangement of the storage area of the disk unit in the divisional segment scheme. As shown in FIG. 20, the storage area of the disk unit is divided into segment management data (indicated by hatching) and four segments in units of stripes. In this case, a segment is a unit area in which bulk write processing of write buffer data or disk write processing in compaction is intensively performed in a certain period. If, for example, while segment 2 is subjected to disk write processing, selection of empty areas is controlled such that no write processing is executed with respect to segments 1, 3, and 4.

When the empty area of a given segment decreases, and a disk write is switched to another segment, segment management data is stored in the disk unit. As shown in FIG. 19, the segment management data is constituted by a segment number and a conversion map used when a segment is switched. The segment number is the segment number of the destination segment. The conversion map used when the segment is switched indicates the state of the conversion map 8 in the volatile memory 3 when the segment is switched.

Note that all the data of a conversion map used when a segment is switched need not be overwritten every time a segment is switched, but only the entries of the logical addresses written in the preceding segment may be written back. If, therefore, the time stamp is stored when the preceding segment is switched and compared with the time stamp of the conversion map, the logical addresses written in the preceding segment can be determined.

In this divisional segment scheme, segment management data is stored when a segment is switched. The same conversion map as that obtained by checking all logical address tags can therefore be reproduced by simply reading out a conversion map used when a segment is switched from the segment management information, and checking only the logical address tags of the segment designated by a segment number of the segment management data. In this scheme, the number of required logical address tags corresponds to only one segment. In this example, therefore, the time required to create a conversion map can be shortened to 1/4.

In addition, a bit map corresponding to all the stripes in the segments in the nonvolatile memory 4 is prepared. When a segment is to be switched, this bit map is cleared. When a bulk write or a write in compaction is performed, the bit corresponding to each written stripe is set to "1". With this operation, the bits corresponding to only the updated stripes upon switching of a segment are set to "1". In creating a conversion map, therefore, the number of checks can be further decreased by looking up this bit map, and checking only the logical address tags of the updated stripes, thereby further shortening the time required to create a conversion map.

Figure 21:
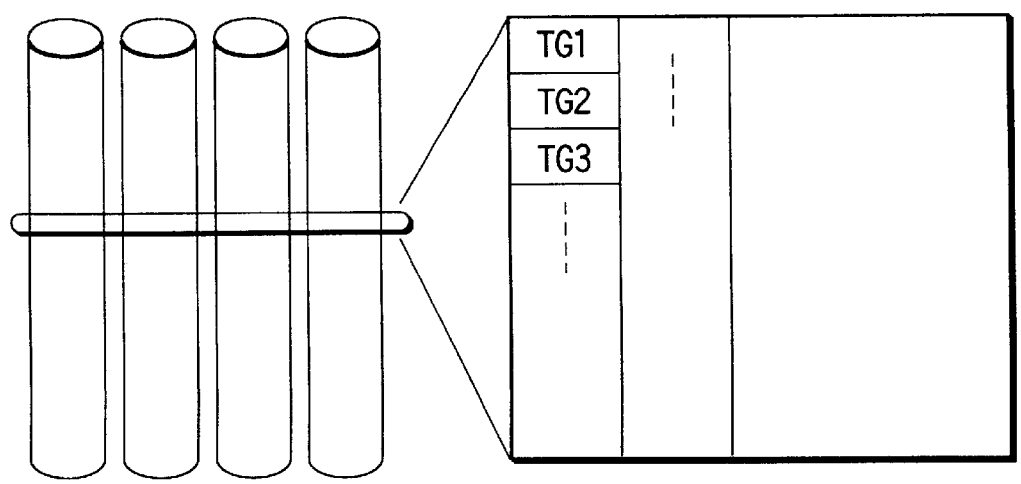
FIG. 21 is a view showing the contents of a dedicated tag area according to this embodiment.

In general, a logical address tag has a size of 512 to 1,024 bytes, and a sequential access to a disk is about 50 times higher in performance than a random access. According to the scheme shown in FIG. 5, since logical address tag data are randomly present in the respective stripes, a time-consuming random access is executed to create a conversion map. For this reason, a dedicated tag area (prepared in each segment when the divisional segment scheme is employed) for contiguously storing only logical address tags is prepared to read out logical address tags by a sequential access which is 50 times higher in speed than a random access, as shown in FIG. 21. When bulk write processing or compaction of data from the host system 10 is to be performed, a logical address tag is written in both an empty area and a corresponding dedicated tag area. According to this scheme, since the logical address tag is written in the dedicated tag area, the number of writes increases by one as compared with a case where disk write processing is performed four times per stripe. However, a conversion map can be created at a speed 50 times higher than that in the above scheme, and hence this scheme is very effective when the rise time of the disk unit is at issue. To minimize the time required to write data in the dedicated tag area, the dedicated tag area is preferably set around a target area as a center, as shown in FIG. 21, so as to shorten the seek time of each disk drive. In general, the disk unit 2 executes write processing in units of sectors (e.g., 512 bytes). For this reason, logical address tags are preferably allocated in the dedicated tag area in units of sectors to obviate the need to perform read processing in write processing of logical address tags.

(Time Stamp)

As shown in FIG. 2, the time stamp 5 is stored in the volatile memory 3. For this reason, when, for example, the power supply of the system fails, the time stamp 5 in the volatile memory 3 may be erased. As in the case of the conversion map 8, therefore, only when the system is started, the logical address tags of all the stripes are checked, and a value next to the largest value of the time stamp 5 is set in the time stamp 5 in the volatile memory 3. Note that the time saving technique described in association with the creation of a conversion map can be directly applied to the reproduction of a time stamp.

Every time the time stamp 5 is written in the disk unit 2, the value of the time stamp 5 is incremented to be used for only determination processing for the write order of data on a disk. Assume that the time stamp 5 is constituted by a 24-bit counter. The 24-bit counter completes one cycle and is cleared when write processing is performed 16 mega times. In general, therefore, the effective minimum value of the time stamp 5 is set as a reference, and 16M is added to a value smaller than the reference to be used for comparison and determination. This minimum value is also obtained by checking the logical address tags of all stripes only when the system is started. This technique, however, can be used on the precondition that the maximum value of the time stamp does not pass the minimum value, i.e., the difference between the maximum value and minimum value of the time stamp falls within a range in which the difference can be expressed by 24 bits. The value of the time stamp 5 must therefore be updated by updating all the stripes without fail before one cycle is complete. For this purpose, stripes in which ineffective blocks have not been updated in at least an interval corresponding to a predetermined number of writes are selected to be compacted, or only the logical address tags of stripes in which NULL addresses are set as the logical addresses of ineffective blocks are rewritten. The method using NULL addresses is a method of rewriting logical address tag blocks, and hence is always a light-load process as compared with a compaction process.

In the above example, only the method of performing ineffective block determination processing by comparing the logical address tags of two stripes ST1 and ST2 has been described. To check all the ineffective blocks, all the combinations of the blocks of the two stripes must be checked. With a conversion map, however, in checking the respective logical addresses in the logical address tags, a time stamp of the conversion map indicating effective data is compared with the time stamp of a corresponding stripe, and a block with a smaller value can be determined as an ineffective block.

(Modification of Embodiment)

Figure 22:
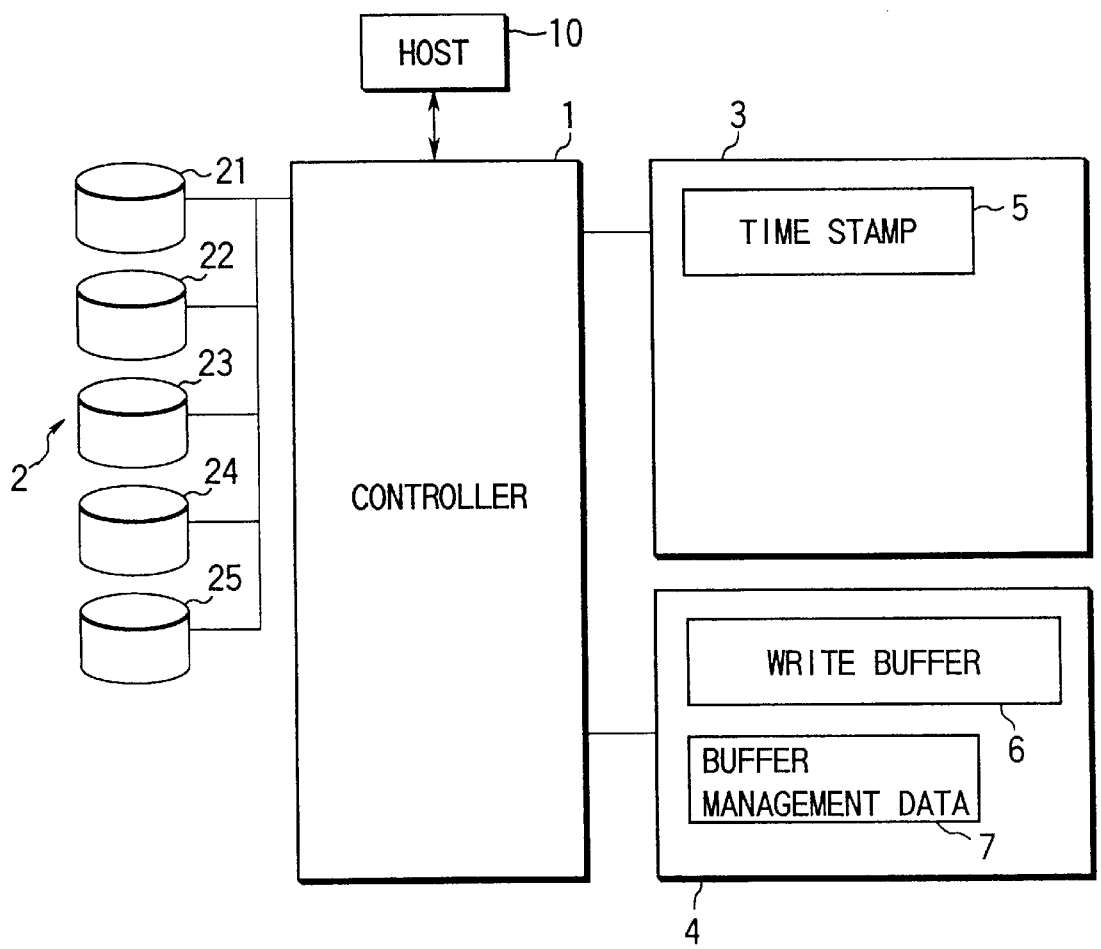
FIG. 22 is a block diagram showing the conceptual arrangement of a disk storage system having a RAID5 architecture according to a modification of this embodiment.

FIG. 22 shows a modification of this embodiment. The embodiment can be applied to all RAID0 through RAID5. The modification in FIG. 22 is a system to which RAID5 having a redundant disk arrangement using parity data is applied.

As shown in FIG. 22, this system has an arrangement equivalent to that of the system in FIG. 2 to which a redundant disk drive 25 is added. Note that the remaining components, namely a controller 1, a disk unit 2 (disk drives 21, 22, 23, and 24), a volatile memory 3, a nonvolatile memory 4, a time stamp 5, a write buffer 6, and a buffer management data (table) 7, are components having the same functions as those in the embodiment in FIG. 2.

The operation of the system of this modification will be described below by mainly explaining the differences between the modification and the embodiment. In write processing, when (N*K−1) blocks, of the write data from the host system 10, which are smaller in number than the blocks of one stripe by one are stored in the write buffer 6, the controller 1 writes these data in the disk drives 21 through 25. In this case, the subsequent processing up to the creation of a logical address tag block as the last write block from the logical address of each block stored in the buffer management table 7 and the time stamp 5 in the volatile memory 3 is the same as in this embodiment.

Subsequently, the controller 1 executes exclusive OR (XOR) processing from one-stripe data having a logical address tag block added thereto in units of stripe units to create a stripe unit of parity data (P). The stripe data with the parity data are simultaneously written in the disk drives 21 through 25 in bulk. When read processing is to be performed in units of variable-length blocks as in this embodiment, a stripe nearest to the empty area where the difference from the current stripe position on each disk is minimized is selected as an empty area for a write. With this selection method, the response times for write processes based on the seek times on the respective disks can be made uniform. When read processing is to be performed in units of stripes, such a problem need not be considered.

When the write processing is complete, the value of the time stamp 5 is incremented. In this manner, many elaborate disk write processes can be combined into one process. In addition, since old data or old parity data blocks required for parity calculation need not be read, the number of disk accesses can be further decreased. In disk write processing in a stripe compaction process as well, stripes with parity data are created first in the same manner as described above, and the resultant data are then written in the disk unit 2 (see FIG. 23).

In the system using a RAID5 architecture having a redundant disk arrangement (parity), even if one disk drive fails, the data in the faulty disk drive can be restored by executing XOR processing between the data and parity data in another disk drive which constitute stripes. If, however, one disk drive is faulty when the system is started, since a check is made after logical address tags are reproduced by also reading out data from disk drives in which no logical address tags are stored, a much time is required to create the conversion map 8. The time required to completely start the system is greatly prolonged.

Figure 23:
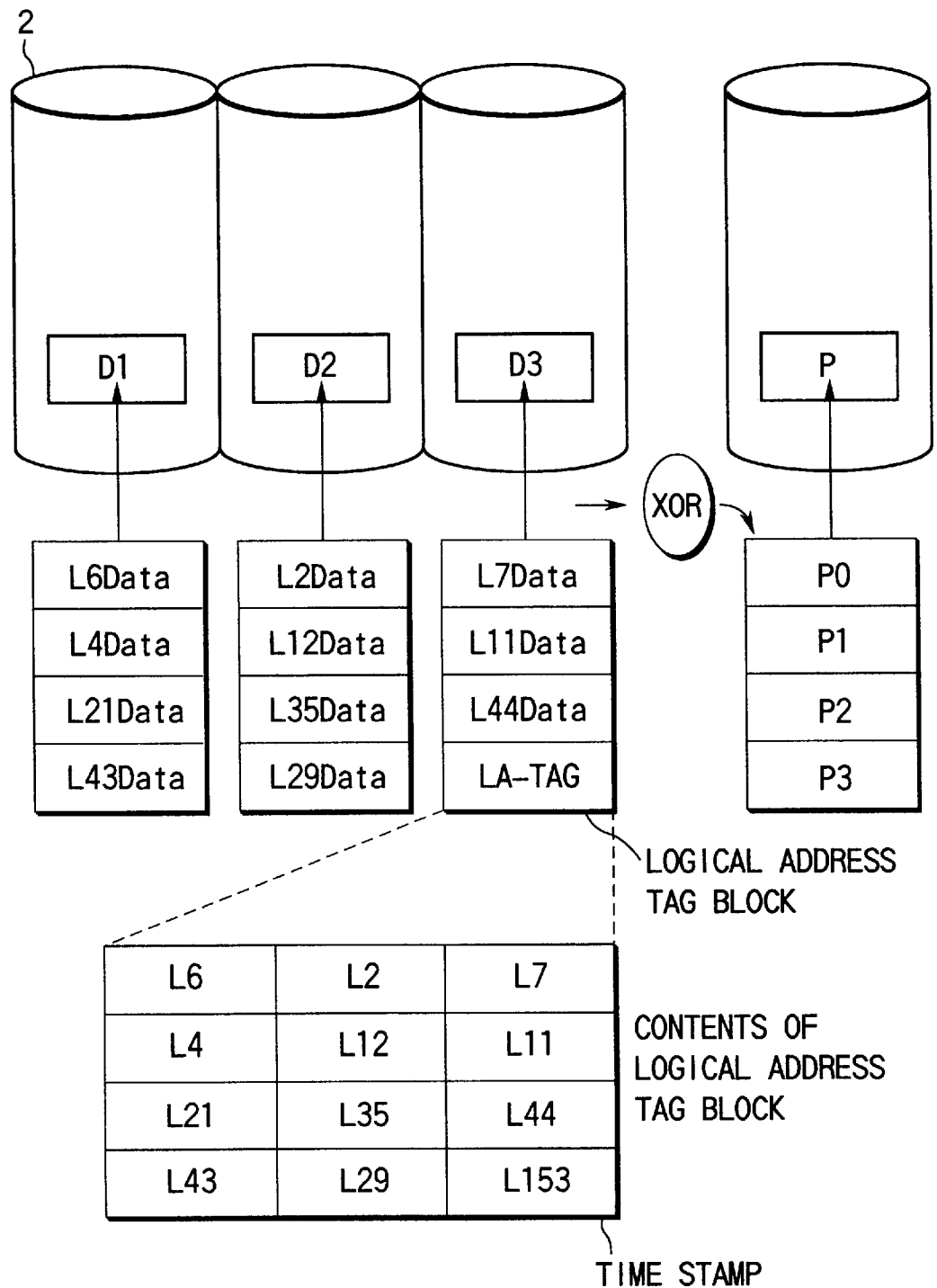
FIG. 23 is a view for explaining the operation of this modification.
Figure 24:
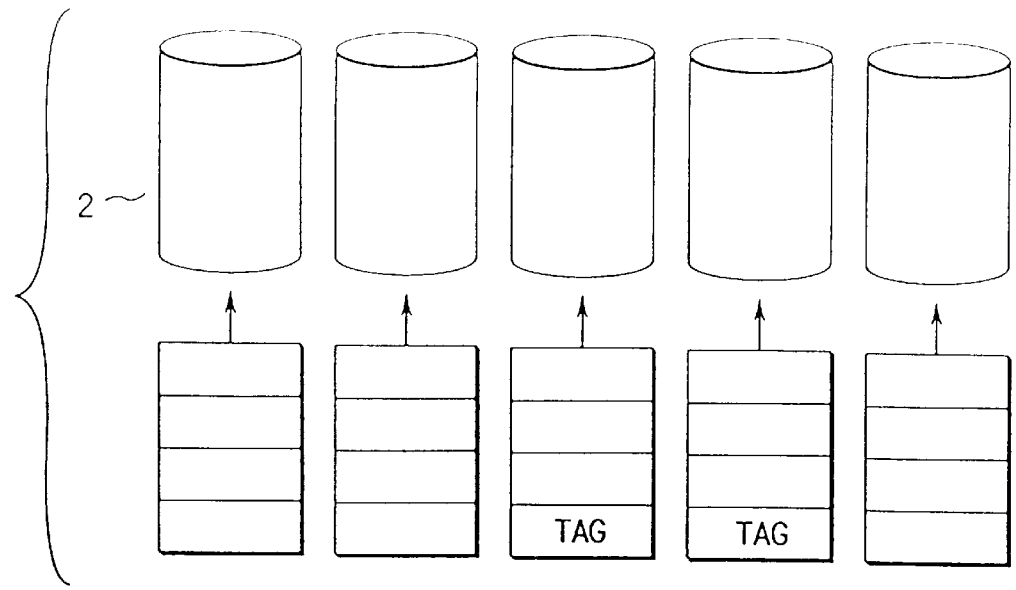
FIG. 24 is a view showing a method of creating logical address tags according to this modification.

As shown in FIG. 23, therefore, the data blocks constituted a stripe is decreased by one, and identical logical address tags are written in two disk drives. With this control, even if one disk drive fails, since logical address tags can be read out from the remaining disk drive in creating the conversion map 8, a great increase in time required to start the system can be prevented.

Figure 25:
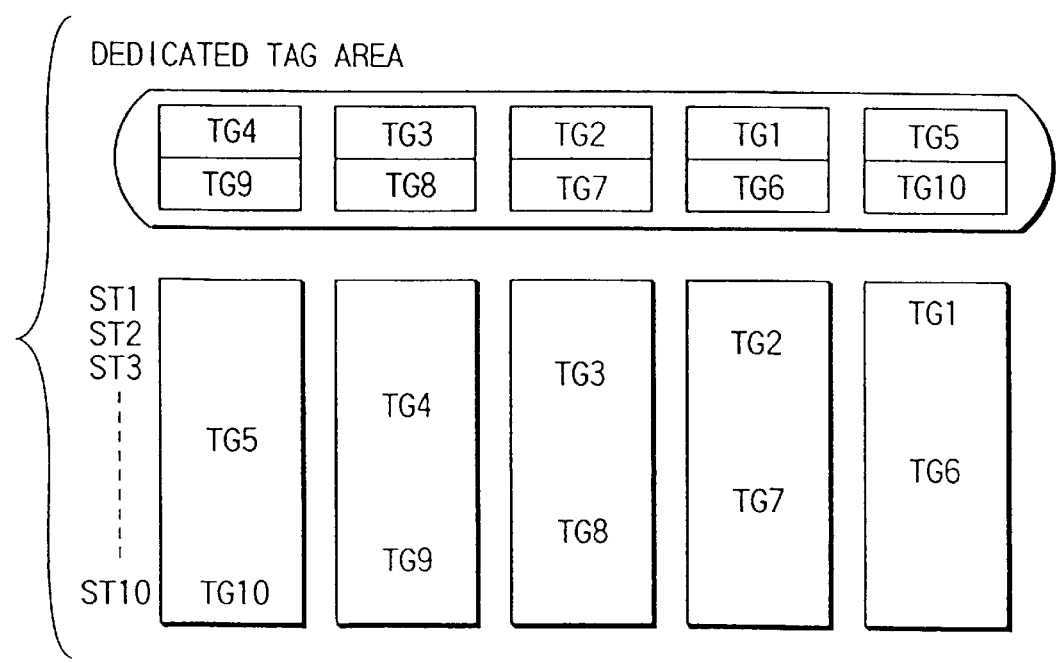
FIG. 25 is a view for explaining a method of allocating a dedicated tag area according to this modification.

When a dedicated tag area is to be used to create a conversion map at a high speed, allocation of logical address tags to the dedicated tag area is controlled such that a disk drive in which logical address tags are stored in a dedicated tag area (allocated to a disk position corresponding to the highest access frequency) differs from each disk drive in which logical address tags are stored in stripes, as shown in FIG. 25. With this control, it suffices if one logical address tag is stored in a stripe.

In the case wherein logical address tags are written in the dedicated tag area as well, if parity data is used to take countermeasures against disk failures, write processing and read processing must be performed twice each, unlike a conventional system which requires only one write. As a result, the overhead of a disk write operation in a bulk write process or a stripe compaction process greatly increases. Preferably, therefore, the above countermeasures using parity data are not taken for the data in the dedicated tag area. The data in the dedicated tag area is used to create a conversion map at a high speed. If a disk drive having a dedicated tag area fails, logical address tags in stripes can be checked (by a random access) as those stored in the dedicated tag area. No problem is therefore posed. In addition, since the number of logical address tags to be checked by a random access decreases to 1/5, a conversion map can be created at a high speed.

This embodiment is applied to a disk storage system having a RAID architecture. However, the present invention is not limited to this. For example, the present invention can be applied to a system using magneto-optical disks. The present invention can also be applied to a disk storage system whose performance greatly varies depending on sequential write processing and random write processing and a disk storage system having a RAID architecture with redundancy which uses parity data that demands two reads and two writes in updating small blocks.

The above compaction process and the function of selecting contiguous storage areas and sequentially writing data therein by continuous write operations may be controlled by software or hardware. When hardware control is to be performed, for example, a DMA function may be implemented on a bus controller chip to realize control by means of DMA transfer.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk storage system comprising:

N (N is a positive integer of two or more) disk storages;

a write buffer having a storage capacity corresponding to N*K (K is an integer indicating the number of blocks);

buffer management means for managing logical addresses that are included in data to be written in the write buffer;

means for writing (N*K-1) write block data into (N*K-1) blocks of the write buffer, the writing means rearranging, when a plurality of write block data whose logical addresses are contiguous is detected by the buffer management means, the plurality of write block data into contiguous blocks of the write buffer and writing the rearranged write block data in the write buffer;

means for generating a logical address tag block corresponding to the write block data from the logical addresses of the (N*K-1) write block data and time stamps indicating the write time, and writing the generated logical address tag block into the remaining one block in the write buffer; and means for contiguously storing, as a single stripe, the (N*K-1) write block data and the logical address tag block written into the write buffer into empty areas of the N disk storages.

2. The system according to claim 1, wherein the buffer management means has a buffer management table, and wherein the buffer management means divides a data length of the write block data in units of optimal blocks to be stored in the write buffer in a log form, and wherein the buffer management means stores in an entry of the buffer management table corresponding to a storage area of the write buffer the logical address and the time stamps included in the write block data.

3. The system according to claim 1, wherein the buffer management means divides the write block data and writes the divided data into a plurality of contiguous blocks of the write buffer when the write block data has a length extending over a plurality of blocks of the write buffer.

4. The system according to claim 1, wherein the buffer management means performs a write operation from the write buffer into the empty areas of the N disk storages such that physical blocks are stored in a contiguous manner so that a read request for the contiguous physical blocks in the single stripe can be made with respect to the write block data when the physical addresses of the plurality of the write block data are not arranged contiguously while the logical addresses thereof are contiguous.

5. The system according to claim 1, further comprising:
means for, in response to a read request from a host system, reading, in the write buffer, the write block data and the logical address tag block of the stripe corresponding to the read request; and
means for, when the logical addresses of the logical address tag block are contiguous, rearranging the plurality of write block data into contiguous blocks in the write buffer, forming (N*K−1) block data together with other write block data, writing the formed (N*K−1) block data in the write buffer, generating and writing the logical address tag block in the write buffer.

6. The system according to claim 1, further comprising:
means for reading the write block data and the logical address tag blocks from a plurality of stripes written in the N disk storages;
means for detecting only effective write block data from the logical address tag blocks; and
means for arranging and writing the data whose logical addresses are contiguous in the contiguous blocks of the write buffer when the effective write block data is written in (N*K−1) blocks of the write buffer.

7. The system according to claim 6, further comprising:
means for rearranging and writing in the remaining one block of the write buffer the logical address tag blocks in conformity to the write arrangement of the write block data; and
means for arranging the rearranged logical address tag blocks and (N*K−1) write block data into a single stripe of data and contiguously storing the single stripe of data in other empty areas of the N disk storages.

8. A disk storage system, comprising:
(N+1) (N is a positive integer of two or more) disk storages;
a write buffer having a storage capacity corresponding to N*K (K is an integer indicating the number of blocks);
buffer management means for managing logical addresses that are included in data to be written in the write buffer;
means for writing (N*K−1) write block data into (N*K−1) blocks of the write buffer, the writing means rearranging, when a plurality of block data whose logical addresses are contiguous is detected by the buffer management means, the plurality of block data into contiguous blocks of the write buffer and writing the rearranged write block data into the write buffer;
means for generating a logical address tag block corresponding to the write block data from the logical addresses of the (N*K−1) write blocks and time stamps indicating the write time, and writing the generated logical address tag block into the remaining one block in the write buffer;
means for generating K parity blocks corresponding to K stripe data consisting of the (N*K−1) write block data and the logical address tag block by using an exclusive OR operation; and
means for contiguously storing, as a single stripe, the (N*K−1) write data, the logical address tag block and the K parity blocks into empty areas of the (N+1) disk storages.

9. A data update method applied to a disk storage system constituted by N disk storages (N is a positive integer of two or more), comprising the steps of:
writing (N*K−1) write block data in (N*K−1) blocks of a write buffer having a storage capacity corresponding to N*K (K is an integer indicating the number of blocks), the writing step rearranging, when a plurality of block data whose logical addresses are contiguous is detected by a buffer management means managing logical addresses that the write block data includes, the plurality of block data into contiguous blocks of the write buffer and writing the rearranged block data in the write buffer;
generating a logical address tag block corresponding to the write block data from the logical addresses of the (N*K−1) write blocks and time stamps indicating the write time, and writing the generated logical address tag block into the remaining one block in the write buffer; and
contiguously storing, as a single stripe, the (N*K−1) write block data and the logical address tag block written into the write buffer into empty areas of the N disk storage.

10. The method according to claim 9, wherein the writing step of the write block data includes a step of dividing the write block data and writing the divided data into a plurality of contiguous blocks of the write buffer when the write block data has a length extending over a plurality of blocks of the write buffer.

11. The method according to claim 9, wherein the writing step of the write block data performing a write operation from the write buffer into the empty area of the N disk storages such that physical blocks are stored in a contiguous manner so that a read request for the contiguous physical blocks in the single stripe can be made with respect to the write block data when the physical addresses of the plurality of the write block data are not arranged contiguously while the logical addresses thereof are contiguous.

12. The method according to claim 9, further comprising the steps of:
reading, in response to a read request from a host system, in the write buffer, the write block data and the logical address tag block of the stripe corresponding to the read request;
forming, when the logical addresses of the logical address tag block are contiguous, the plurality of write block data into contiguous blocks in the write buffer;
arranging (N*K−1) block data together with other write block data, writing the arranged (N*K−1) block data in the write buffer, and generating and writing the logical address tag block in the write buffer.

13. The method according to claim 9, further comprising:
reading the write block data and the logical address tag blocks from a plurality of stripes written in the N disk storages;
detecting only effective write block data from the logical address tag blocks; and
allocating the data whose logical addresses are contiguous to the contiguous blocks of the write buffer when the effective write block data is written in the (N*K−1) blocks of the write buffer.

14. The method according to claim 13, further comprising:
rearranging and writing in the remaining one block of the write buffer the logical address tag blocks in conformity to the write arrangement of the write block data; and arranging the rearranged logical address tag blocks and the (N*K−1) write block data into a single stripe of data and contiguously storing the single stripe of data in other empty areas of the N disk storages.

15. The method according to claim 9, further comprising the steps of:

reading logical address tag blocks of all the stripes from the N disk storages when a system is powered;

forming a conversion map for converting a logical address to a physical address by using the logical address as a hash key; and executing a read operation by accessing a disk storage storing an effective write block data by using the conversion map in response to a read request from a host system.

16. The method according to claim 9, further comprising the steps of:

reading logical address tag blocks of all the stripes from the N disk storages when a system is powered;

forming a conversion map for converting a logical address to a physical address having a tree structure in which the logical address is two-branched; and executing a read operation by accessing a disk storage storing an effective write block data by using the conversion map in response to a read request from a host system.

17. A data update method applied to a disk storage system constituted by (N+1) (N is a positive integer of two or more) disks storages, comprising the steps of:

writing (N*K−1) write block data in (N*K−1) blocks of a write buffer having a storage capacity corresponding to N*K (K is an integer indicating the number of blocks), the writing step rearranging, when a plurality of block data whose logical addresses are contiguous is detected by a buffer management means managing logical addresses that the write block data have, the plurality of block data into contiguous blocks of the write buffer and writing the rearranged block data in the write buffer;

generating a logical address tag block corresponding to the write block data from the logical addresses, of the (N*K−1) write blocks and time stamps indicating the write time, and writing the generated logical address tag block into the remaining one block in the write buffer;

generating K parity blocks corresponding to K stripe data consisting of the (N*K−1) write block data and the logical address tag block by using an exclusive OR operation; and contiguously storing, as a single stripe, the (N*K−1) write block data, the logical address tag block and the K parity blocks into empty areas of the (N+1) disk storages.

* * * * *